United States Patent
Cajias et al.

(10) Patent No.: US 11,550,340 B2
(45) Date of Patent: Jan. 10, 2023

(54) METHOD AND APPARATUS FOR PROVIDING DYNAMIC OBSTACLE DATA FOR A COLLISION PROBABILITY MAP

(71) Applicant: HERE Global B.V., Eindhoven (NL)

(72) Inventors: Raul Cajias, Berlin (DE); Daniel Rolf, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 338 days.

(21) Appl. No.: 16/709,513

(22) Filed: Dec. 10, 2019

(65) Prior Publication Data

US 2021/0173415 A1    Jun. 10, 2021

(51) Int. Cl.

| | |
|---|---|
| *G05D 1/10* | (2006.01) |
| *G05D 1/00* | (2006.01) |
| *G08G 5/04* | (2006.01) |
| *G06K 9/00* | (2022.01) |
| *G08G 5/00* | (2006.01) |
| *G06T 3/40* | (2006.01) |
| *B64C 39/02* | (2006.01) |
| *G06V 20/64* | (2022.01) |

(52) U.S. Cl.
CPC ............ *G05D 1/106* (2019.05); *B64C 39/024* (2013.01); *G05D 1/0088* (2013.01); *G05D 1/0094* (2013.01); *G06T 3/4053* (2013.01); *G06V 20/64* (2022.01); *G08G 5/003* (2013.01); *G08G 5/045* (2013.01); *B64C 2201/12* (2013.01); *B64C 2201/141* (2013.01)

(58) Field of Classification Search
CPC .... G05D 1/1064; G05D 1/106; G05D 1/0088; G05D 1/0094; G06V 20/64; B64C 39/024; B64C 2201/12; B64C 2201/141; G06T 3/4053; G08G 5/003; G08G 5/045
See application file for complete search history.

(56) References Cited

U.S. PATENT DOCUMENTS

| | | | |
|---|---|---|---|
| 7,737,878 | B2 | 6/2010 | Van Tooren et al. |
| 9,940,842 | B2 | 4/2018 | Shaw et al. |
| 2010/0100269 | A1 | 4/2010 | Ekhaguere et al. |
| 2016/0189550 | A1 | 6/2016 | Chan et al. |
| 2017/0263132 | A1 | 9/2017 | Butler et al. |

(Continued)

*Primary Examiner* — Russell Frejd
*Assistant Examiner* — Sara J Lewandroski
(74) *Attorney, Agent, or Firm* — Jeffrey R. Moisan; Here Global B.V.

(57) ABSTRACT

An approach is provided for dynamic obstacle data in a collision probability map. The approach, for example, involves monitoring a flight of an aerial vehicle through a three-dimensional (3D) space that is partitioned into 3D shapes of varying resolutions. The approach also involves detecting an entry of the aerial vehicle into one 3D shape of the plurality of 3D shapes. The approach further involves, on detecting an exit of the aerial vehicle form the one 3D shape, recording a 3D shape identifier (ID) of the one 3D shape and at least one of a first timestamp indicating the entry, a second timestamp indicating the exit, a duration of stay in the one 3D shape, dimensions of the aerial vehicle, or a combination thereof as a dynamic obstacle observation record. The approach further involves transmitting the dynamic obstacle observation record to another device (e.g., a server for creating the collision probability map).

8 Claims, 23 Drawing Sheets

(56) References Cited

U.S. PATENT DOCUMENTS

| | | | |
|---|---|---|---|
| 2018/0253979 A1* | 9/2018 | Rey | G08G 5/0069 |
| 2019/0051198 A1* | 2/2019 | Nimmagadda | G08G 9/02 |
| 2019/0082650 A1* | 3/2019 | Lepek | A01M 1/026 |
| 2019/0272665 A1* | 9/2019 | X | G06T 17/05 |
| 2020/0365037 A1* | 11/2020 | Yamada | G01C 21/34 |
| 2020/0380876 A1* | 12/2020 | Sachdeva | G01C 21/20 |
| 2021/0035459 A1* | 2/2021 | Yamada | B64C 39/024 |
| 2021/0074168 A1* | 3/2021 | Yamada | G08G 5/0026 |
| 2021/0297921 A1* | 9/2021 | Pragada | H04W 72/048 |
| 2021/0358310 A1* | 11/2021 | Sachs | B64D 45/00 |

\* cited by examiner

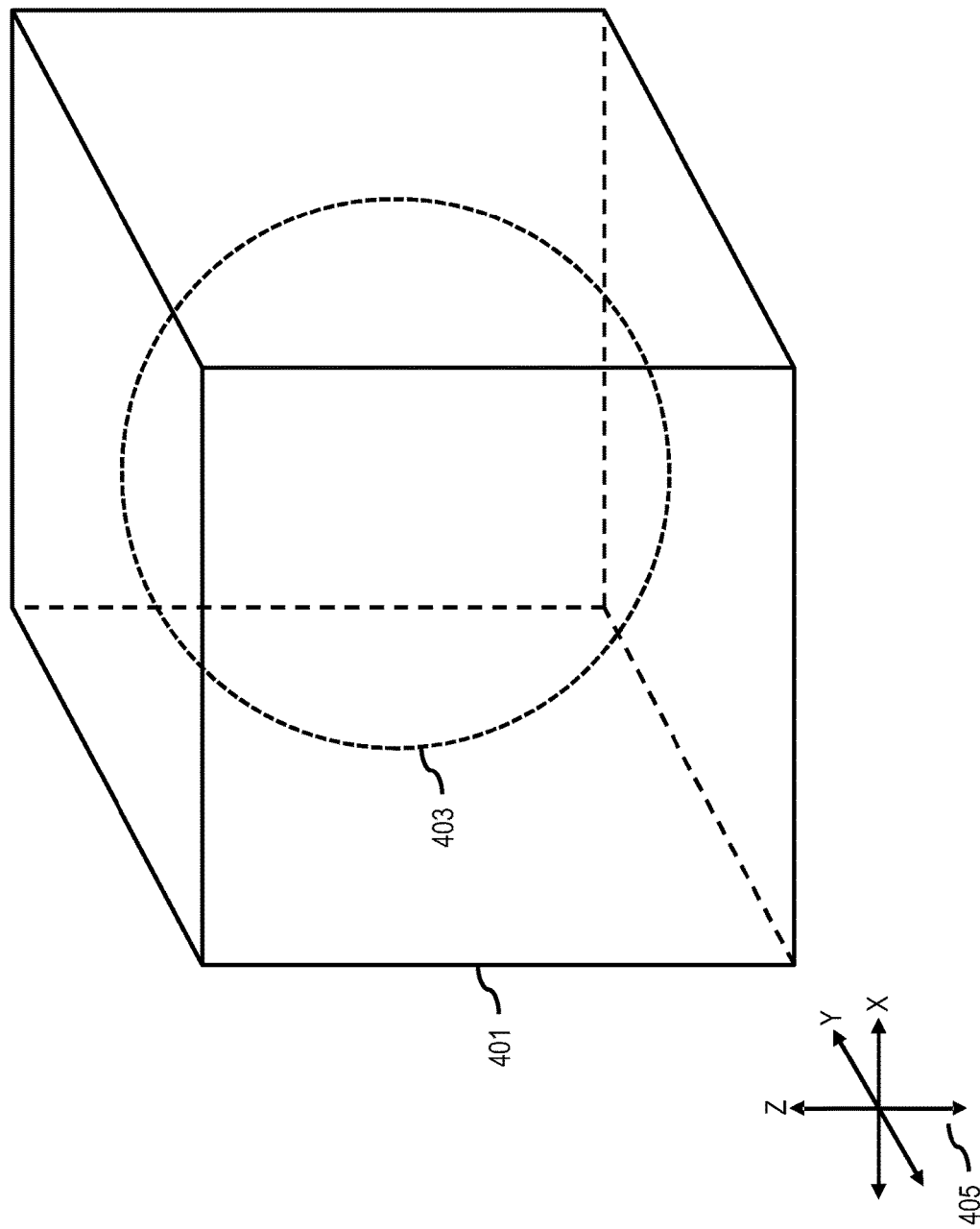

METHOD AND APPARATUS FOR PROVIDING DYNAMIC OBSTACLE DATA FOR A COLLISION PROBABILITY MAP

BACKGROUND

Routing an aerial vehicle or drone (e.g., unmanned aerial vehicle (UAV)) in a three-dimensional (3D) space or environment presents unique challenges due to the complex geometry of obstacles (e.g., trees, cables, lampposts) in the aerial vehicle's flightpath or route. These obstacles can also include dynamic or moving obstacles such as other aerial vehicles operating in the same area. Because these of challenges, service providers face significant technical issues with respect to providing mapping data (e.g., proper modeling of the three-dimensional word) to enable aerial vehicles to be routed more safely through 3D space, particularly when operating autonomously.

SOME EXAMPLE EMBODIMENTS

Therefore, there is a need for providing aerial route calculation in a 3D space based, for instance, on collision probability data that also accounts for dynamic obstacles (e.g., other aerial vehicles). Such dynamic obstacle can be particularly technically challenging to model because of the inherent transiency.

According to one embodiment, a method comprises monitoring a flight of an aerial vehicle through a three-dimensional (3D) space that is partitioned into a plurality of 3D shapes of varying resolutions. The method also comprises detecting an entry of the aerial vehicle into one 3D shape of the plurality of 3D shapes. The one 3D shape represents a bounded volume of the 3D space. The method further comprises on detecting an exit of the aerial vehicle form the one 3D shape, recording a 3D shape identifier (ID) of the one 3D shape and at least one of a first timestamp indicating the entry, a second timestamp indicating the exit, a duration of stay in the one 3D shape, dimensions of the aerial vehicle, or a combination thereof as a dynamic obstacle observation record. The method further comprises transmitting the dynamic obstacle observation record to another device (e.g., a server to calculate dynamic obstacle collision probability data for the 3D space).

According to another embodiment, an apparatus comprises at least one processor, and at least one memory including computer program code for one or more computer programs, the at least one memory and the computer program code configured to, with the at least one processor, cause, at least in part, the apparatus to monitor a flight of an aerial vehicle through a three-dimensional (3D) space that is partitioned into a plurality of 3D shapes of varying resolutions. The apparatus is also caused to detect an entry of the aerial vehicle into one 3D shape of the plurality of 3D shapes. The one 3D shape represents a bounded volume of the 3D space. The apparatus is further caused, on detecting an exit of the aerial vehicle form the one 3D shape, to record a 3D shape identifier (ID) of the one 3D shape and at least one of a first timestamp indicating the entry, a second timestamp indicating the exit, a duration of stay in the one 3D shape, dimensions of the aerial vehicle, or a combination thereof as a dynamic obstacle observation record. The apparatus is further caused to transmit the dynamic obstacle observation record to another device (e.g., a server to calculate dynamic obstacle collision probability data for the 3D space).

According to another embodiment, a computer-readable storage medium carries one or more sequences of one or more instructions which, when executed by one or more processors, cause, at least in part, an apparatus to monitor a flight of an aerial vehicle through a three-dimensional (3D) space that is partitioned into a plurality of 3D shapes of varying resolutions. The apparatus is also caused to detect an entry of the aerial vehicle into one 3D shape of the plurality of 3D shapes. The one 3D shape represents a bounded volume of the 3D space. The apparatus is further caused, on detecting an exit of the aerial vehicle form the one 3D shape, to record a 3D shape identifier (ID) of the one 3D shape and at least one of a first timestamp indicating the entry, a second timestamp indicating the exit, a duration of stay in the one 3D shape, dimensions of the aerial vehicle, or a combination thereof as a dynamic obstacle observation record. The apparatus is further caused to transmit the dynamic obstacle observation record to another device (e.g., a server to calculate dynamic obstacle collision probability data for the 3D space).

According to another embodiment, an apparatus comprises means for monitoring a flight of an aerial vehicle through a three-dimensional (3D) space that is partitioned into a plurality of 3D shapes of varying resolutions. The apparatus also comprises means for detecting an entry of the aerial vehicle into one 3D shape of the plurality of 3D shapes. The one 3D shape represents a bounded volume of the 3D space. The apparatus further comprises for, on detecting an exit of the aerial vehicle form the one 3D shape, recording a 3D shape identifier (ID) of the one 3D shape and at least one of a first timestamp indicating the entry, a second timestamp indicating the exit, a duration of stay in the one 3D shape, dimensions of the aerial vehicle, or a combination thereof as a dynamic obstacle observation record. The method further comprises transmitting the dynamic obstacle observation record to another device (e.g., a server to calculate dynamic obstacle collision probability data for the 3D space).

According to one embodiment, a method comprises receiving at least one dynamic obstacle observation record from at least one aerial vehicle traveling through a three-dimensional (3D) space partitioned into a plurality of 3D shapes of varying resolutions. The at least one dynamic obstacle observation record indicates at least one 3D shape traversed by the at least one aerial vehicle and at least one of a first timestamp indicating an entry of the at least one aerial vehicle into the at least one 3D shape, a second timestamp indicating an exit of the at least one aerial vehicle from the at least one 3D shape, a duration of stay in the at least one 3D shape, dimensions of the at least one aerial vehicle, or a combination thereof. The method also comprises processing the at least one dynamic obstacle observation record to compute dynamic obstacle collision probability data for the at least one 3D shape with respect to one or more constants. The method further comprises providing the dynamic obstacle collision probability data as an output.

According to another embodiment, an apparatus comprises at least one processor, and at least one memory including computer program code for one or more computer programs, the at least one memory and the computer program code configured to, with the at least one processor, cause, at least in part, the apparatus to receive at least one dynamic obstacle observation record from at least one aerial vehicle traveling through a three-dimensional (3D) space partitioned into a plurality of 3D shapes of varying resolutions. The at least one dynamic obstacle observation record indicates at least one 3D shape traversed by the at least one aerial vehicle and at least one of a first timestamp indicating an entry of the at least one aerial vehicle into the at least one 3D shape, a second timestamp indicating an exit of the at least one aerial vehicle from the at least one 3D shape, a duration of stay in the at least one 3D shape, dimensions of the at least one aerial vehicle, or a combination thereof. The apparatus is also caused to process the at least one dynamic obstacle observation record to compute dynamic obstacle collision probability data for the at least one 3D shape with respect to one or more constants. The apparatus is further caused to provide the dynamic obstacle collision probability data as an output.

According to another embodiment, a computer-readable storage medium carries one or more sequences of one or more instructions which, when executed by one or more processors, cause, at least in part, an apparatus to receive at least one dynamic obstacle observation record from at least one aerial vehicle traveling through a three-dimensional (3D) space partitioned into a plurality of 3D shapes of varying resolutions. The at least one dynamic obstacle observation record indicates at least one 3D shape traversed by the at least one aerial vehicle and at least one of a first timestamp indicating an entry of the at least one aerial vehicle into the at least one 3D shape, a second timestamp indicating an exit of the at least one aerial vehicle from the at least one 3D shape, a duration of stay in the at least one 3D shape, dimensions of the at least one aerial vehicle, or a combination thereof. The apparatus is also caused to process the at least one dynamic obstacle observation record to compute dynamic obstacle collision probability data for the at least one 3D shape with respect to one or more constants. The apparatus is further caused to provide the dynamic obstacle collision probability data as an output.

According to another embodiment, an apparatus comprises means for receiving at least one dynamic obstacle observation record from at least one aerial vehicle traveling through a three-dimensional (3D) space partitioned into a plurality of 3D shapes of varying resolutions. The at least one dynamic obstacle observation record indicates at least one 3D shape traversed by the at least one aerial vehicle and at least one of a first timestamp indicating an entry of the at least one aerial vehicle into the at least one 3D shape, a second timestamp indicating an exit of the at least one aerial vehicle from the at least one 3D shape, a duration of stay in the at least one 3D shape, dimensions of the at least one aerial vehicle, or a combination thereof. The apparatus also comprises means for processing the at least one dynamic obstacle observation record to compute dynamic obstacle collision probability data for the at least one 3D shape with respect to one or more constants. The apparatus further comprises means for providing the dynamic obstacle collision probability data as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4C are diagrams illustrating an example representation of a 3D space as discrete 3D volumes (e.g., cubes or other equivalent 3D shapes) for calculating an aerial route, according to one embodiment;

DESCRIPTION OF SOME EMBODIMENTS

Examples of a method, apparatus, and computer program for providing an aerial route through a three-dimensional (3D) space using collision probability data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
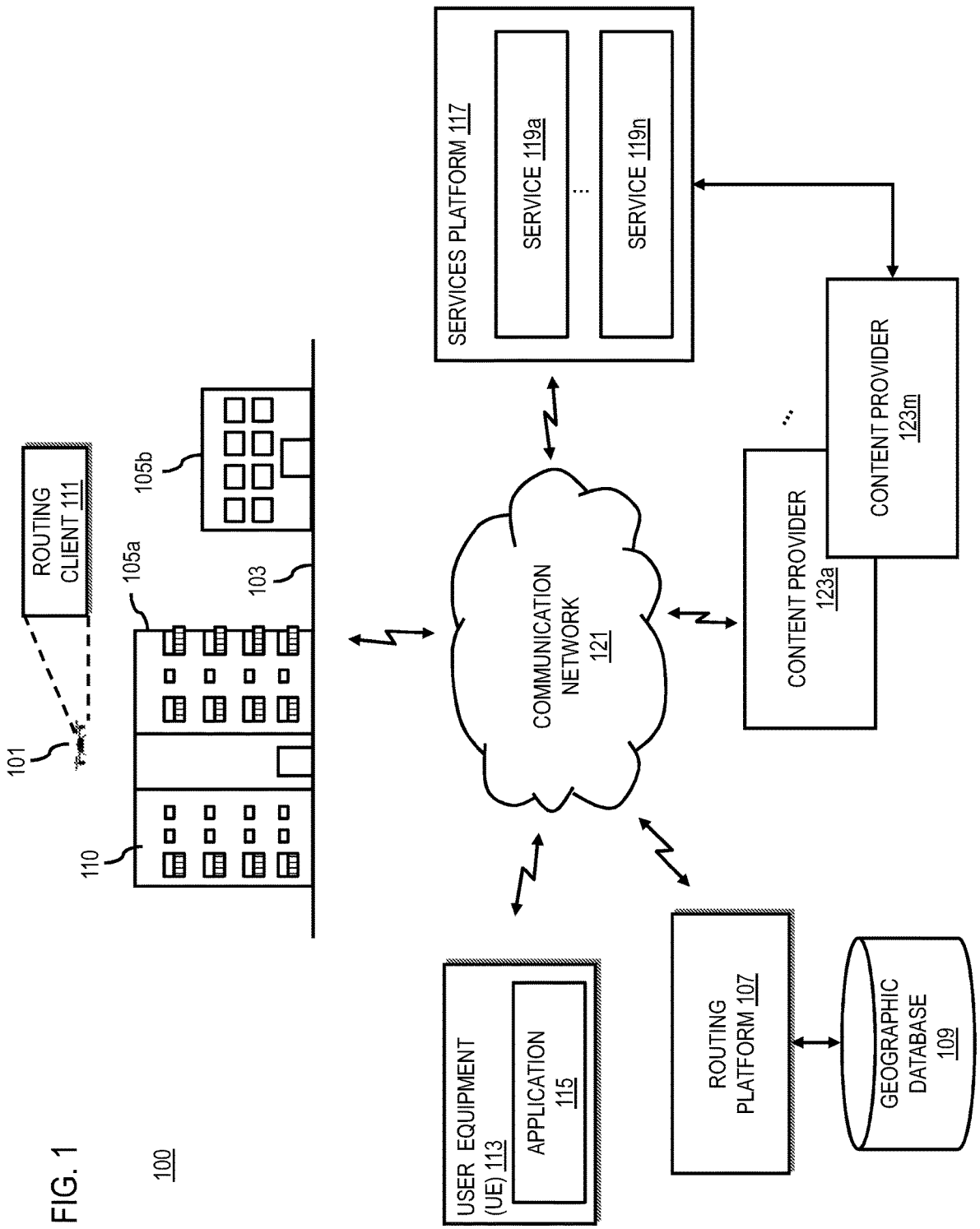
FIG. 1 is a diagram of a system capable of calculating an aerial route using a collision probability space, according to one embodiment.

FIG. 1 is a diagram of a system capable of calculating an aerial route using a collision probability space, according to one embodiment. The use of manned or unmanned aerial vehicles is becoming more widespread, leading to greater concern about flight safety with respect to aerial vehicle itself as well as the environment or 3D space in which it is operating. Generally, an aerial vehicle 101 operates by flying above streets 103, buildings 105*a* and 105*b* (also collectively referred to as buildings 105), and/or other complex 3D spaces where safety risks to the public and/or the aerial vehicle 101 are often present. Aerial routing in such a 3D environment presents unique challenges due, for instance, to the complex geometry of static obstacles (e.g., buildings 105, trees, cables, lamp posts, etc.) and dynamic obstacles (e.g., other aerial vehicles 101) present within the environment. For example, the absence of proper modeling of the 3D world and the obstacles (e.g., both static and dynamic) contained therein results in the aerial vehicle 101's having to rely solely on onboard sensors for obstacle detection, or on human operators, to navigate around obstacles or other collision risks in the environment.

In other words, aerial vehicles 10 historically rely on onboard sensors and/or human operators to navigate complex 3D environments. Moreover, common obstacles are often avoided by routing the aerial vehicle 101 to fly over known road networks and/or at a higher altitude to minimize risks. These traditional heuristics for aerial routing may not be applicable in all cases such as in cases of dynamic obstacles whose presence or density along a route can change over time. This, in turn, can lead to potentially preventing autonomous aerial vehicles 101 from gaining wider adoption.

Further, by relying on simple heuristics or solely on onboard sensors, no estimate or only a less specific estimate can be made of the risk of the planned path or route of the aerial vehicle 101. This lack of visibility on potential loss or risks can prevent reliable usage of aerial vehicles 101. Therefore, service providers face significant technical challenges when assessing and then presenting the risks associated with a calculated aerial route (e.g., a collision probability of the aerial vehicle 101).

To address these technical challenges, the system 100 of FIG. 1 introduces a capability to provide route calculation in a 3D environment using a pre-computed collision-probability route network. The collision probability data used to generate route network includes an aerial traffic prediction system to estimate the dynamic obstacle density (e.g., density of other aerial vehicles 101 traveling within the same area) in the 3D space in which aerial vehicles 101 operate. In one embodiment, the traffic prediction system receives reports from aerial vehicles 101 while in flight indicating its size, route, location, etc. The traffic prediction system then incorporates this dynamic obstacle observation report into a time-dependent 3D collision probability map. More specifically, in one embodiment, the system 100 leverages reports generated by aerial vehicles 101 as they are navigated along aerial routes computed based on a partitioning of their flight environment or 3D space into a hierarchy of 3D shapes (e.g., cubes or other shapes). These 3D shapes, for instance, represent the flight environment at varying resolutions or volumes of the partitioned 3D space. By way of example, these reports are generated to indicate when each aerial vehicle 101 enters or exits a 3D shape or cube of 3D space that is along its route as well as the physical dimensions, shapes, etc. of the aerial vehicle 101. The reports can then be used to predict the traffic density for a given cube or volume of 3D space at different time epochs, prediction windows, etc. to provide dynamic obstacle collision probability data for generating a 3D collision probability map of the area.

In one embodiment, the system 100 of FIG. 1 includes a routing platform 107) to compute an aerial or 3D route from point A to point B for an aerial vehicle 101 (e.g., a drone) using a collision-probability 3D map (e.g., as stored in a geographic database 109). In another embodiment, the system 100 of FIG. 1 includes a routing client 111 (e.g., in the aerial vehicle 101) that interacts with the routing platform 107 for the computation and receiving of an aerial route from point A to point B for the aerial vehicle 101 using a collision-probability 3D map. By way of example, the various embodiments described enable aerial or 3D routes to be computed for aerial vehicles 101 using a collision-probability graph. This has the advantage of providing important survival probabilities to the aerial vehicle 101 that can be used to preempt client-side maneuvers, as well as valuable information for operators, dispatch systems, etc. of the aerial vehicles 101 (e.g., for risk planning, loss prevention, dispatching an appropriate aerial vehicle 101, etc.).

Figure 2:
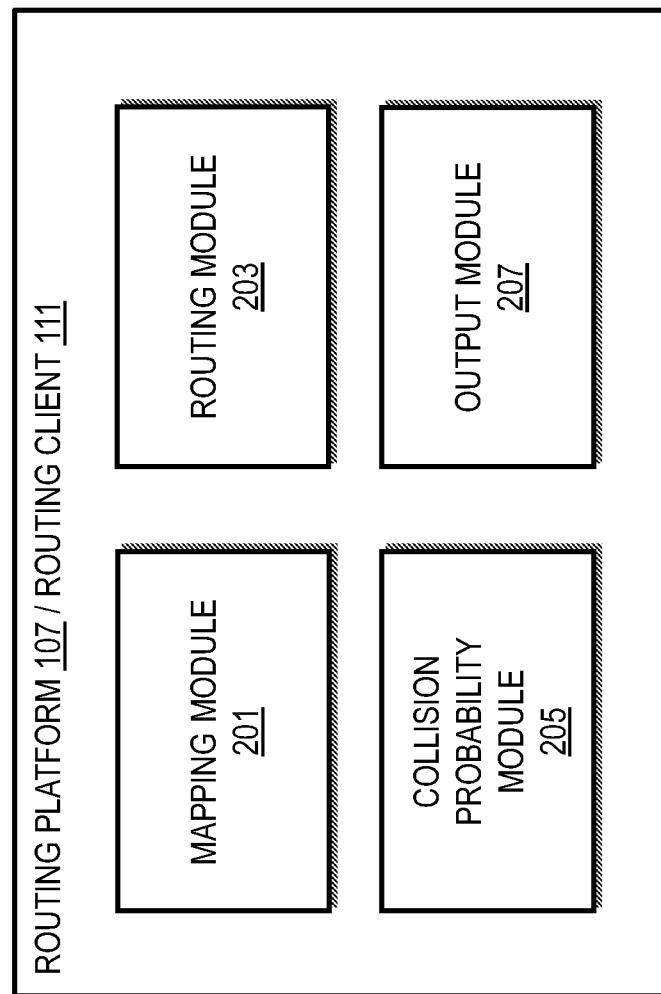
FIG. 2 is a diagram of the components of an aerial routing platform and/or routing client, according to one embodiment.

FIG. 2 is a diagram of the components of the aerial routing platform 107 and/or routing client 111, according to one embodiment. In one embodiment, the routing platform 107 and/or routing client 111 include one or more components for providing and using an aerial or 3D route based on a collision-probability map, according to the various embodiments described herein. As shown in FIG. 2, the routing platform 107 and/or routing client include a mapping module 201, a routing module 203, a collision probability module 205, and an output module 207. The above presented modules and components of the routing platform 107 and/or routing client 111 can be implemented in hardware, firmware, software, or a combination thereof. It is contemplated that the functions of these components may be combined or performed by other components of equivalent functionality. Though depicted as separate entities in FIG. 1, it is contemplated that the routing platform 107 and/or routing client 111 may be implemented as a module of any of the components of the system 100 (e.g., a component of the aerial vehicle 101, a client device such as a user equipment (UE) device 113 executing the routing client 111 as an application 115, a services platform 117, one or more services 119a-119n of the services platform 117, etc.). In another embodiment, the routing platform 107, routing client 111, and/or one or more of the modules 201-207 may be implemented as a cloud-based service, local service, native application, or combination thereof. The functions of these modules are discussed with respect to FIGS. 3-17 below.

Figure 3:
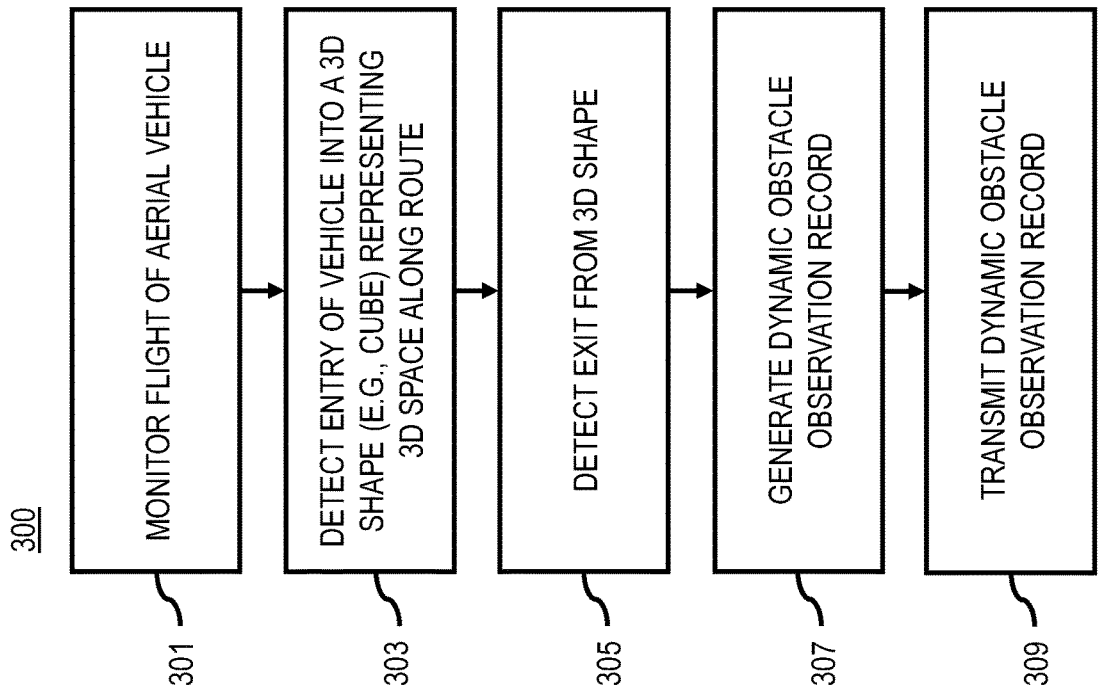
FIG. 3 is a flowchart of a process for client-side reporting of dynamic obstacle observation records, according to one embodiment.

FIG. 3 is a flowchart of a process for client-side reporting of dynamic obstacle observation records, according to one embodiment. In various embodiments, the routing client 111 and/or any of the modules 201-207 of the routing platform 107 may perform one or more portions of the process 300 and may be implemented in, for instance, a chip set including a processor and a memory as shown in FIG. *\. As such, the routing client 111 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, to perform the process 300, the routing client 111 and the routing platform 107 have access to a 3D collision-probability map that can be used to calculate an aerial route. The 3D collision-probability map can be queried from a geographic database 109 that stores the collision-probability data at variable resolution. The geographic database 109 can be a cloud-based database that includes the latest or most up-to-date version of the collision-probability as well as the underlying map data. In one embodiment, the variable resolution can be defined with respect a common 3D coordinate system (e.g., X, Y, Z coordinate system) shared by both the routing platform 107 and the routing client 111. In addition, the routing client 111 has access to a 3D route decoding mechanism as described further below with respect to FIG. 15 or equivalent.

Figure 4B:
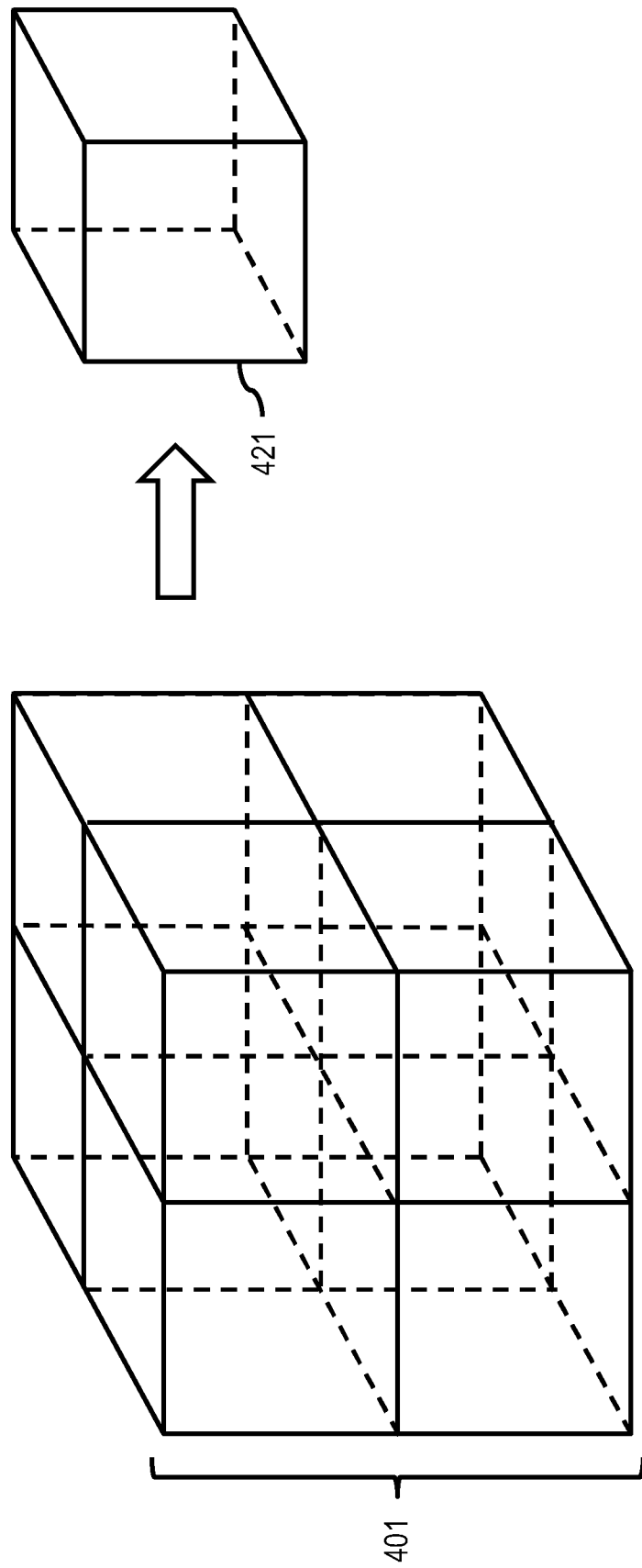

In one embodiment, the 3D coordinate system can be a global coordinate system that defines a 3D location on or above the Earth using X, Y, Z coordinates. The 3D space on or surrounding the Earth can also be represented using 3D shapes defined at a variable resolution. FIGS. 4A and 4B are diagrams illustrating an example representation of a 3D space as discrete volumes/partitions (e.g., cubes or other equivalent 3D shapes) for calculating an aerial route, according to one embodiment. Under this representation, a maximum or largest 3D volume is defined to enclose the space of interest. In this example, the 3D volume selected is a cube 401 and the space of interest is the entire Earth 403.

It is noted however, that the space of interest can be a space of any size that covers Earth 403 only partially or that covers any other heavenly body (e.g., moon) or other space (e.g., including extraterrestrial space). Locations in the cube 401 are given in a 3D X, Y, Z coordinate system. As shown, the Earth cube 401 is cube of length 16,000 km. At the center of this Earth cube 401 is the Earth 403 (e.g., radius equal to 6371 km), centered at coordinates (8,000 km, 8,000 km, 8,000 km). Hence, the Earth cube 401 fully covers the earth plus approximately 1,500 km of atmosphere. Any point within the Earth cube 401 can be easily converted from and to a latitude, longitude, and altitude coordinate system. However, in this example, an X, Y, Z coordinate system is more suitable for 3D maps.

As shown in FIG. 4B, for a given partitioning level or resolution of the initial Earth cube 401, the Earth cube can be partitioned into level^3 equal-sized cubes. In the example shown, at a partitioning or resolution level of 2, the Earth cube 401 is partitioned into 2^3 or 8 equal-sized cubes. At a partitioning level of 3, the Earth cube 401 is partitioned into 3^3 or 27 equal-sized cubes; at a partitioning level of 4, the Earth cube 401 is partitioned into 4^3 or 64 equal-sized cubes; and so on. A single partition or 3D volume 421 can be addressed by its center in 3D X, Y, Z coordinates, as well as the partitioning level from which its volume (e.g., the amount of 3D space the cube represents) can be derived. In one embodiment, each partition or 3D volume 421 is called a CUBE with its CUBE-ID defined at its center X, Y, Z coordinates and the corresponding partitioning or resolution level. Furthermore, each face of the cube 421 is assigned a unique identifier (ID) (e.g., CUBE-ID-0, . . . , CUBE-ID-5, where the numeral after CUBE-ID corresponds to a respective face of the cube or other 3D shape).

In one embodiment, to create the collision probability map, each cube or 3D volume/shape is assigned a collision probability. By way of example, the collision probability can be determined by intersecting the space corresponding to the cube or other 3D shape with the 3D map of the geographic database 109. The 3D map, for instance, can include 3D models of structures (e.g., buildings), obstacles (e.g., wires, lamp posts, trees, etc.), and/or another map feature or element that can potentially pose a survival risk to aerial vehicles 101. 3D models of static obstacles (e.g., buildings, trees, etc.) can used to calculate the collision probability from static obstacles, and 3D models or physical dimensions of dynamic obstacles (e.g., other aerial vehicles 101) can be used to calculate the collision probability of dynamic obstacles.

Figure 4C:
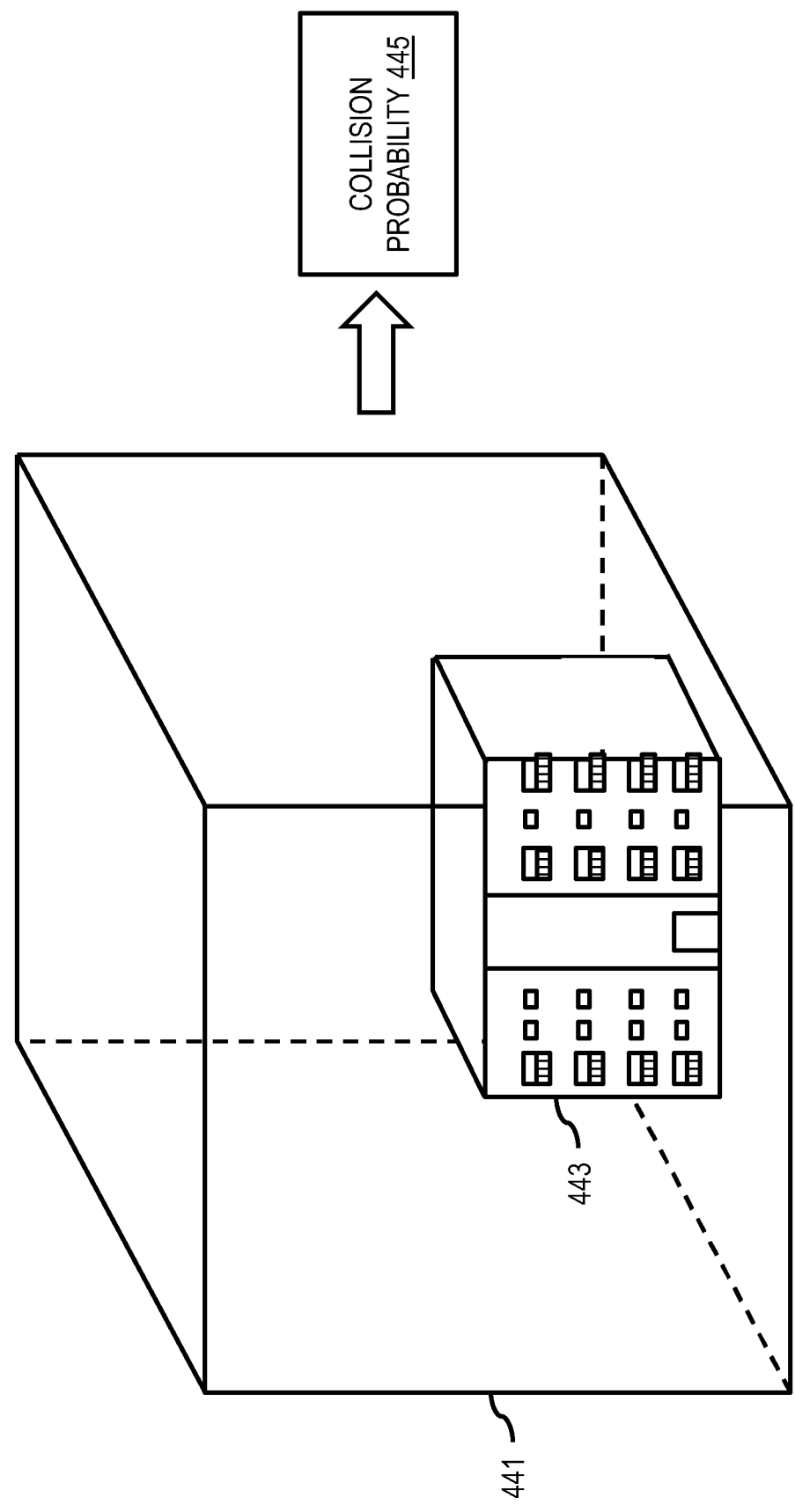

In one embodiment, the collision probability is calculated as the ratio of the cube or 3D volume space that does not contain or is not contained in the volume of an obstacle (e.g., an element of the 3D map correspond to an obstacle, dimensions of a dynamic obstacle, etc.) to the total volume of the cube or other 3D shape. For example, as shown in FIG. 4C the space corresponding to a cube 441 is used to query the geographic database 109 for 3D map data of the space. In this example, the query returns a 3D model 443 of a building that represents the dimensions of the building in space. The collision probability 445 can then be calculated based on the ratio of the space of the cube 441 that is not occupied by the 3D model 443 to the total volume of the cube 441. In other words, if the map data indicates that a greater proportion of the cube 441 is occupied by map elements, then the probability that an aerial vehicle 101 (e.g., drone) will collide with one of the elements is greater. In one embodiment, other external variables applicable to the space of the corresponding cube (e.g., wind patterns, historical collision data, etc.) may also be used as a parameter in determining the collision probability of the cube or other 3D shape. Other examples of external factors include but are not limited to: (1) population or people density under a route; (2) presence of electromagnetic fields; (3) absence of GPS or other location signals; (4) other weather conditions; (5) network (e.g., cellular network) coverage; and (6) aviation-related data (e.g., air traffic density as determined according to the embodiments described herein, etc.).

In one embodiment, the collision probability may be calculated for any partition level or resolution of the 3D map to create a collision-probability map. The collision probability map can be pre-computed and/or generated in real-time. In some embodiments, the collision probability can be computed separately for each partitioning level. In other embodiments, the collision probability for a cube at a partitioning level i is given by the cubes at partitioning level i+1 contained in it. For example, a cube at level i will have eight cubes contained within it that are at level i+1 each with respective collision probabilities (e.g., $p\_1$-$p\_8$). Then the collision probability for the cube at level i can be computed as $1-(1-p\_1)*(1-p\_2)* \ldots *(1-p\_8)$. In one embodiment, this property enables some optimizations to be made when probing for routes in a high-resolution map, as larger areas of the map may be explored at once.

Based on the representation above, the routing module 203 can generate a collision-probability routing graph as a weighted graph $G=(V,E)$, where V is the set of faces of all cubes in the map partition covering the route, and E is the set of cubes (if more than one cube), weighted by the probability of successful navigating (e.g., navigating without failure or collision) inside each cube or 3D volume as described in further detail below.

To initiate the client location reporting process (e.g., dynamic obstacle observation record reporting process), in step 301, the routing client 111 monitors a flight of an aerial vehicle 101 through a 3D space. The 3D space, for instance, is partitioned into a plurality of 3D shapes of varying resolutions according to the embodiments described herein. For example, given an origin point A, and destination point B, the routing client 111 of the aerial vehicle 101 requests a low collision-probability route from the routing platform 107 or equivalent server (e.g., route generated according to the embodiments discussed in more detail below). Upon receiving the aerial route, the routing client 111 decodes the route as a series of adjacent cubes or other 3D shapes describing a safe route in 3D space from A to B. Embodiments of the process for generating an aerial route based on a 3D collision space is described in more detail in the embodiments further below.

In one embodiment, the routing client 111 calculates a route or trajectories along the cubes or 3D spaces of the received aerial route for the aerial vehicle 101 to navigate from A to B. In step 303, as the aerial vehicle 101 moves along the route, the observation information can be recorded, when a new cube or 3D shape on the path is entered. This observation information can include but is not limited to any of the following: (1) cube_id: a unique identifier (ID) of the cube or 3D shape that was entered; and (2) a timestamp indicating a time of entry in the cube or 3D shape (e.g., as a numeric timestamp).

In step 305, when the aerial vehicle 101 exits a cube (e.g., to continue along the route from A to B), the recorded information and/or other related observation information can be reported to the routing platform 107 or other equivalent server. By way example, the recorded information and/or related observation information can include but is not limited to: (1) the recorded cube_id or 3D shape ID; (2) the timestamp as recorded on entry into the cube or 3D shape; (3) another timestamp indicating when the aerial vehicle 101 exited the cube or 3D shape; (4) a duration of stay in the cube or 3D shape (e.g., expressed in minutes, rounded up to the nearest minute; or equivalent; (5) dimensions of the aerial vehicle 101 (e.g., indicating a volume, size, or other physical measurement of the aerial vehicle 101 or the volume of 3D space it occupies); and/or the like. In one embodiment, the dimensions of the aerial vehicle 101 can be reported in an agreed-upon unit (e.g., cc) or any other equivalent standardized unit.

In one embodiment, the cube IDs or 3D shape IDs are on the computed aerial route that the aerial vehicle 101. In other words, the aerial route is computed for the aerial vehicle 101 as an ordered list of cubes or 3D shapes that represent respective adjacent bounded volumes of the 3D space that is to be traversed to navigate the aerial vehicle 101 from A to B. Accordingly, the cube or shape IDs along this route will correspond to the shapes and resolutions calculated by the routing platform 107 and then encoded into the route using a hierarchy of shapes at varying resolutions depending on the 3D collision probability map (e.g., according to the embodiments described further below with respect to FIG. 11). However, if the aerial vehicle 101 is forced into a cube or 3D shape outside the planned cube route (e.g., because of an obstacle, weather, malfunction, etc.), the routing client 111 of the aerial vehicle 101 can pick an arbitrary cube or 3D shape resolution size and continue reporting its journey off of the planned route as described above.

Figure 5:
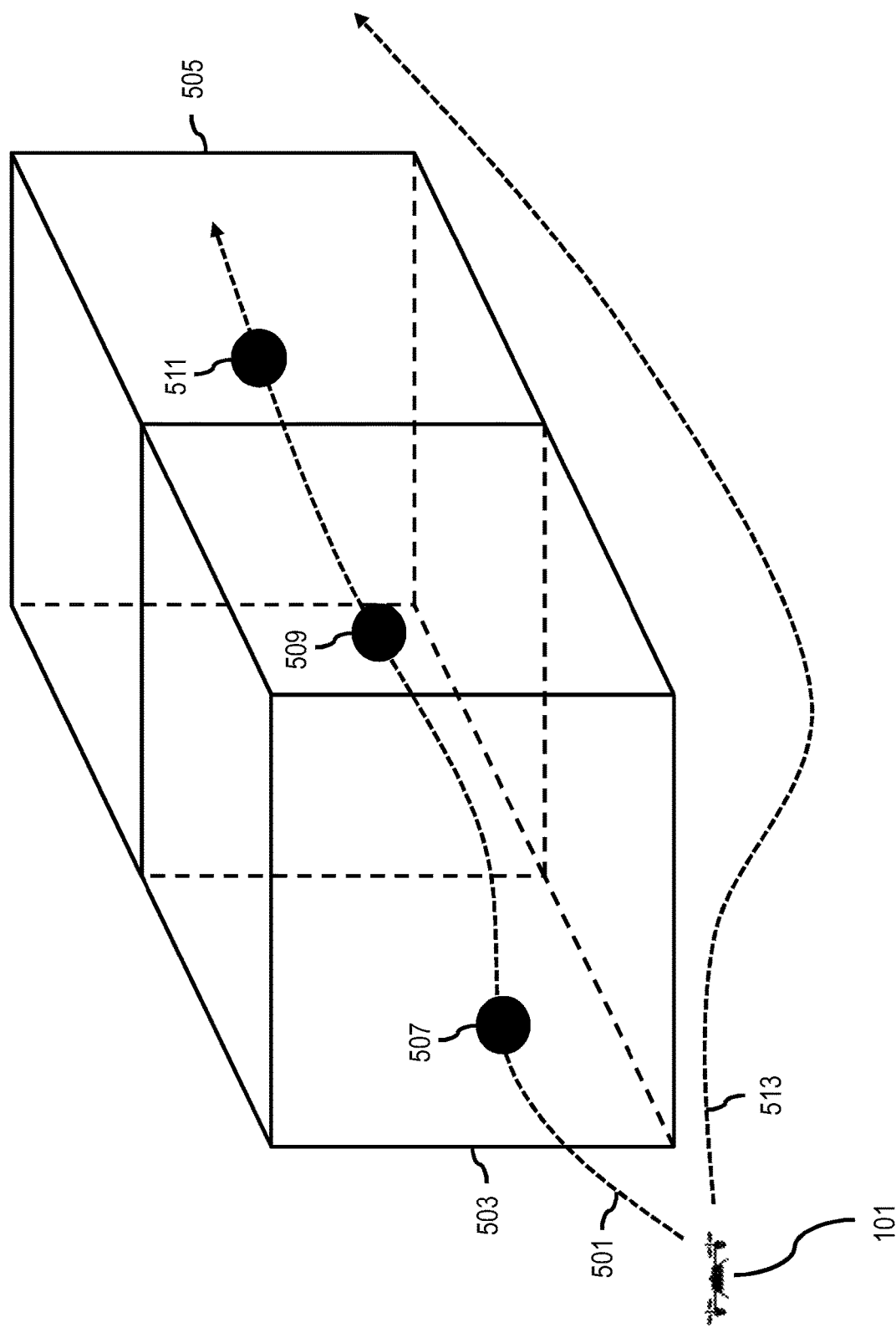
FIG. 5 is a diagram illustrating an example of client-side reporting of dynamic obstacle observation records, according to one embodiment.

An example of this reporting process is illustrated in FIG. 5. As shown, an aerial vehicle is following a planned route 501 that includes cubes 503 and 505 in one segment of the route 501. When following along the planned route 501, the aerial vehicle 101 enters cube 503 at point 507. On detection of the entry into cube 501, the routing client 111 of the vehicle 101 records the ID of the cube 501 and an entry timestamp. The aerial vehicle 101 continues on the planned route 501 through cube 503 to point 509 which is the exit point of cube 503 and also the entry point of the next cube 505. Accordingly, the routing client 111 generates a dynamic obstacle observation record for the cube 503 based on the recorded entry timestamp, exit timestamp, duration of stay in the cube 503, and/or the volume/dimensions of the aerial vehicle 101 to transmit to the collection server (e.g., the routing platform 107). The dynamic obstacle observation record (or obstacle observation record for short) is a data recorded of the data indicating the entered/exited cube or shape, time of entry, duration of stay, and/or any other related data recorded by the routing client 111. At the same time, the entry into the cube 505 is recorded and timestamp to generate the next obstacle observation record for the cube 505. The process can continue until the aerial route is complete.

However, if the aerial vehicle 101 is forced of the planned route 501 or decides otherwise decides to take an unplanned route 513, the routing client 511 can select cubes at any arbitrary resolution (e.g., a default resolution, or a resolution determined from parametrically from factors such as but not limited to flight speed, static collision probability data, distance to destination, user preference, etc.). Then, as the aerial vehicle 101 navigates along the unplanned route, it can determine when it enters or exits the arbitrary resolution cubes or shapes to report obstacle observation records in the same way.

In summary, in step 303, the routing client detects an entry of the aerial vehicle 101 into one 3D shape of the plurality of 3D shapes representing the flight environment. The one 3D shape represents a bounded volume of the 3D space in the aerial vehicle 101's path. In step 305, on detecting an exit of the aerial vehicle 101 from the 3D shape, the routing module 111 records obstacle observation data including but not limited to a 3D shape ID of the one 3D shape and at least one of a first timestamp indicating the entry, a second timestamp indicating the exit, a duration of stay in the one 3D shape, dimensions of the aerial vehicle, or a combination thereof as a dynamic obstacle observation record. In step 307, the routing client 111 transmit the dynamic obstacle observation record to another device such as but not limit to a server (e.g., the routing platform 107). In one embodiment, the server aggregates the dynamic obstacle observation record from the aerial vehicle 101 along with other aerial vehicles to calculate a dynamic obstacle collision probability in the 3D shape (e.g., cube) representing the 3D space.

Figure 6:
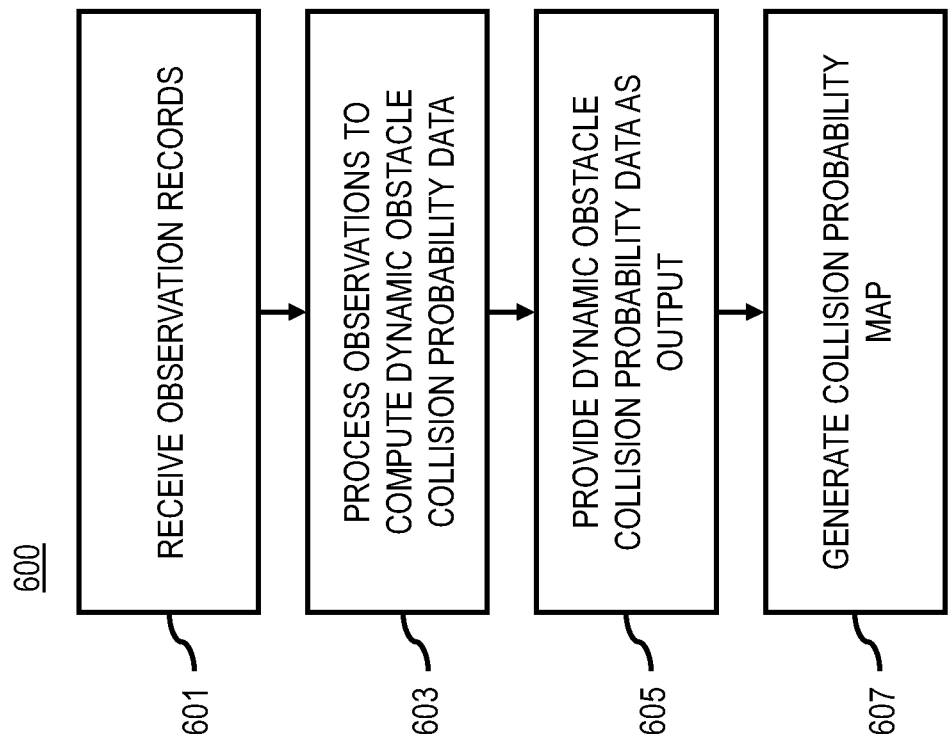
FIG. 6 is a flowchart of a process for dynamic obstacle collision probability data, according to one embodiment.

FIG. 6 is a flowchart of a process for dynamic obstacle collision probability data, according to one embodiment. In various embodiments, the routing platform 107 and/or any of the modules 201-207 of the routing platform 107 may perform one or more portions of the process 300 and may be implemented in, for instance, a chip set including a processor and a memory as shown in FIG. *\. As such, the routing platform 107 and/or the modules 201-207 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In one embodiment, the process 600 generates the dynamic collision probability data as a historical collision probability pattern. A historical collision probability pattern, for instance, is a prediction, into the future, of what the collision probability will be, based on past observed behavior. In one embodiment, the data reported in the obstacle observation record by each individual aerial vehicle 101 represents that observation.

Accordingly, in step 601, the routing platform 107 receives at least one dynamic obstacle observation record from at least one aerial vehicle traveling through a 3D space partitioned into a plurality of 3D shapes of varying resolutions. In one embodiment observation records are received from many aerial vehicles 101 completing trips over a designated period of time (e.g., according embodiments of the process 300 of FIG. 3). The received dynamic obstacle observation records, for instance, indicate at least one 3D shape traversed by the at least one aerial vehicle and at least one of a first timestamp indicating an entry of the at least one aerial vehicle into the at least one 3D shape, a second timestamp indicating an exit of the at least one aerial vehicle from the at least one 3D shape, a duration of stay in the at least one 3D shape, dimensions of the at least one aerial vehicle, or a combination thereof.

In this way, each data point represents a moment in the past, where a moving obstacle of specified dimensions (e.g., an aerial vehicle 101) was detected at some cube or 3D shape for a specified amount of time. In one embodiment, slicing time into epochs of equal length (e.g., 1-minute slices, 5-minutes slices, etc.) and looking at similar moments in time (e.g., epochs that repeat daily, weekly, etc.), the routing platform 107 can compute an prediction for how many moving obstacles are expected to be observed in a given cube, at some epoch, given the past observation records. For example, given an epoch size of 5-minutes, one day can be sliced into 288 epochs, with each of the 288 epochs repeating daily at the same time interval. Predictions can then be checked with reality using realtime sensors, and tuned by manipulating the amount of data considered in the aggregation, the size of the epoch, the prediction window, market penetration of the observations, etc.

In step 603, once the observation record data has been received and stored, the routing platform 107 can process the historical dynamic obstacle observation records to compute dynamic obstacle collision probability data for the cubes or 3D shapes of the 3D space corresponding to the observation records. In one embodiment, the prediction of the dynamic obstacle collision data can be based on one or more defined constants including by not limited to the following:

- Epoch size—determines the granularity of time intervals of a prediction, with shorter epochs enabling predictions to change more quickly depending on how quickly the actual air traffic is expected to change at the expense of potentially decrease sample size or higher levels of inter-epoch variance or noise;
- Prediction window size (PW)—determines over how many epochs into the future a collision probability prediction is made; and
- Period of recorded data to consider—determines over what historical period of time obstacle observation records are aggregated before processing to compute a prediction.

It is contemplated that the routing platform 107 can vary these constants or parameters to achieve a target typical number and/or size of obstacles found in a cube or 3D shape during a selected period.

In one embodiment, after selecting the values of the constants discussed above, the routing platform 107 can transform the obstacle observation records collected from aerial vehicles 101 over the designated historical period to arrive at a historical collision pattern for each cube. For example, the routing platform 107 can determine the collision patterns as follows:

1. Given an obstacle observation record O={cube_id, timestamp, duration, size}
    a. The timestamp and duration are mapped to a continuous set of epochs E=[e_i, e_(i+1), . . . , e_n], wherein E is the set of epochs, e is each epoch beginning from i to n up to the on the chosen prediction window (PW).
b. For each e in E,
i. The routing platform 107 calculates and emits a new value entry Epoch_Observation: {cube_id, e, O.volume}, wherein Epoch_Observation is a new observation record for the corresponding epoch e, and O.volume is the volume or dimensions of the aerial vehicles or moving obstacles observed for epoch e in the historical observations. In one embodiment, O.volume is determined by predicting the numbers and respective sizes of aerial vehicles predicted to occur in the cube during the specified epoch, and then calculating O.volume by multiplying the numbers by the respective sizes over each aerial vehicle 101 or moving obstacle.
2. In one embodiment, if the current cube_id does not point to a cube or 3D shape at the highest or designated map resolution, the routing platform 107 can optionally move to a higher map resolution for the 3D shapes as follows (example provided using a cube as the 3D shape but a similar process can be performed using any other selected 3D shape for representing the 3D space):
a. The routing platform 107 generates 8 child cube IDs for the cubes of equal size bounded by the current cube_id.
b. For each one, the routing platform 107 creates an observation entry Oi={cube_id_i, timestamp, duration, size/8}, where i=1 to 8 corresponding to each of the child cubes or 3D shapes.
c. The routing platform 107 returns to step 1 to process each child cube ID individually until the highest or designated map resolution is reached.

In one embodiment, given the list of Epoch_Observations generated according to the embodiments above, the routing platform 107 can reconstruct an expected obstacle snapshot at each epoch for each cube of interest. The expected obstacle snapshot indicates the number and sizes of moving obstacles or aerial vehicles 101 observed each epoch and cube based on the historical obstacle observation data.

In step 607, the routing platform 107 can use the expected obstacle snapshot to calculate collision probabilities that accounts for moving obstacles or aerial vehicle traffic. In one embodiment, this can be done as follows:
1. The routing platform 107 groups the Epoch_Observations by epoch.
2. For each epoch, the routing platform 107 generates a collision probability map based on dynamic obstacles can be computed by determining the volumes or dimensions of the aerial vehicles 101 or moving obstacles expected to be in a cube or 3D shape in a given epoch, and calculating the ratio of the proportion of the cube or 3D shape that is not occupied by the volume of the moving obstacles to the total volume of the cube or 3D shape.

In one embodiment, the collision probability due to both the dynamic obstacles and the static objects can be combined by computing the ratio for both static and dynamic objects. As a result, a collision probability map is generated from known static map obstacles and expected time-variant obstacles from past observed behavior, for each of the epochs in the prediction window. This process can be repeated periodically to generate new patterns from newer datasets.

Figure 7:
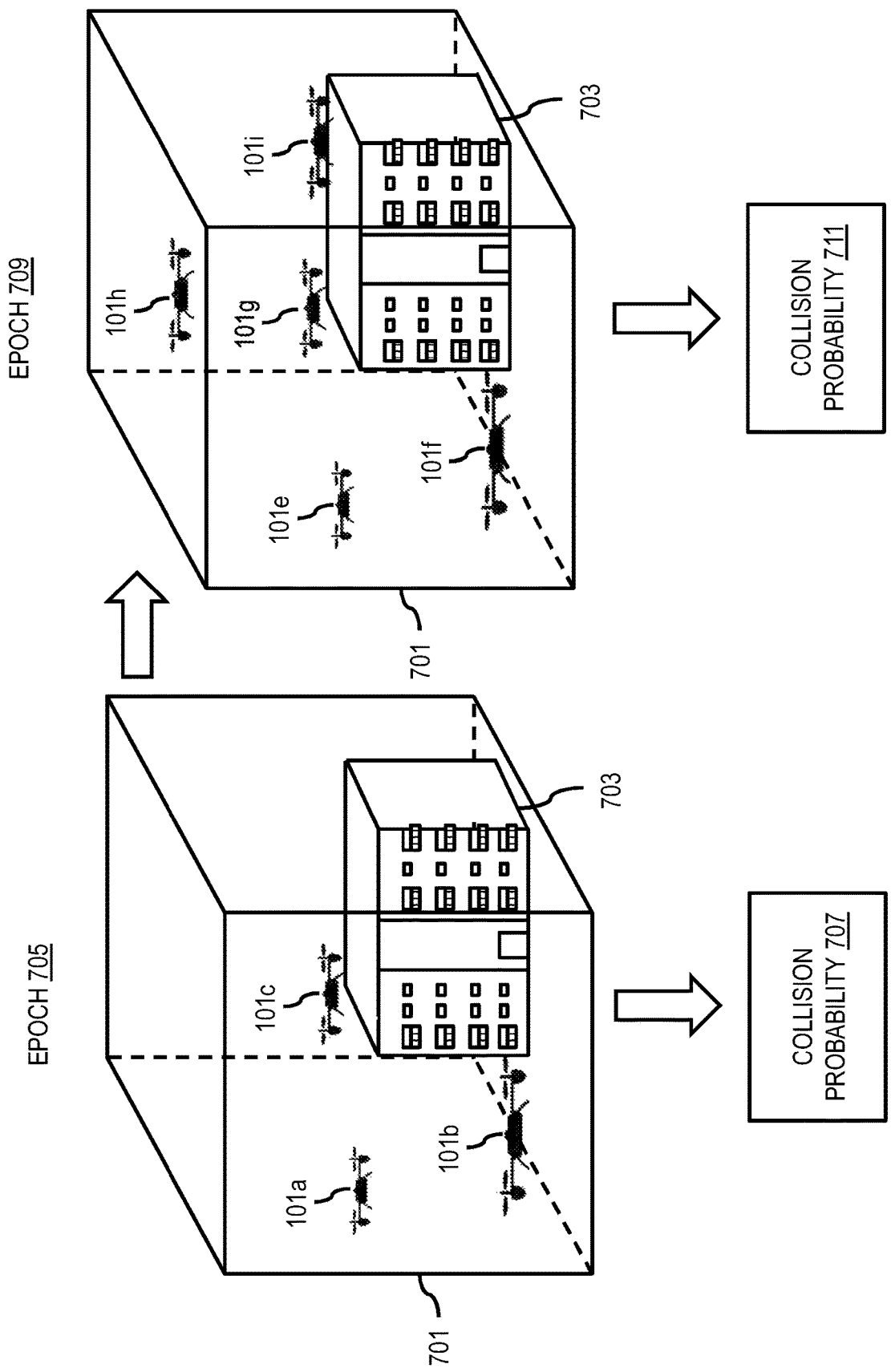
FIG. 7 is a diagram illustrating an example of calculating collision probability data for dynamic obstacles, according to one embodiment.

FIG. 7 is a diagram illustrating an example of calculating collision probability data for dynamic obstacles, according to one embodiment. In the example of FIG. 7, a cube 701 encompasses a static structure 703. The routing platform 107 uses historical observation data to predict that at time epoch 705, the cube 701 has an expected dynamic obstacle snapshot of three aerial vehicles 101a-101c. This means that at epoch 705, there is predicted three aerial vehicles 101a-101c operating in the cube 701. To calculate a collision probability 707 for the cube 701 at epoch 705, the routing platform 107 calculates the volume of the static structure 703 and the predicted volumes of the predicted aerial vehicles 101a-101c to determine a ratio of unoccupied spaced to total space in the cube 701. At the next epoch 709, the routing platform 107 predicts that there will be five aerial vehicles 101e-101i operating in the same cube 701. Accordingly, at epoch 709, the collision probability 711 for the cube 701 can be calculated based on the respective volumes of the five aerial vehicles 101e-101i and the static structure 703. The volume of the give aerial vehicles 101e-101i at epoch 709 is higher than the volume of the three aerial vehicles 101a-101c at epoch 701. Accordingly, the calculated collision probability 711 of the cube 701 at epoch 709 is higher than the collision probability 707 of the cube 701 at epoch 705. This difference can be indicated in the collision map for the cube 701.

Figure 8:
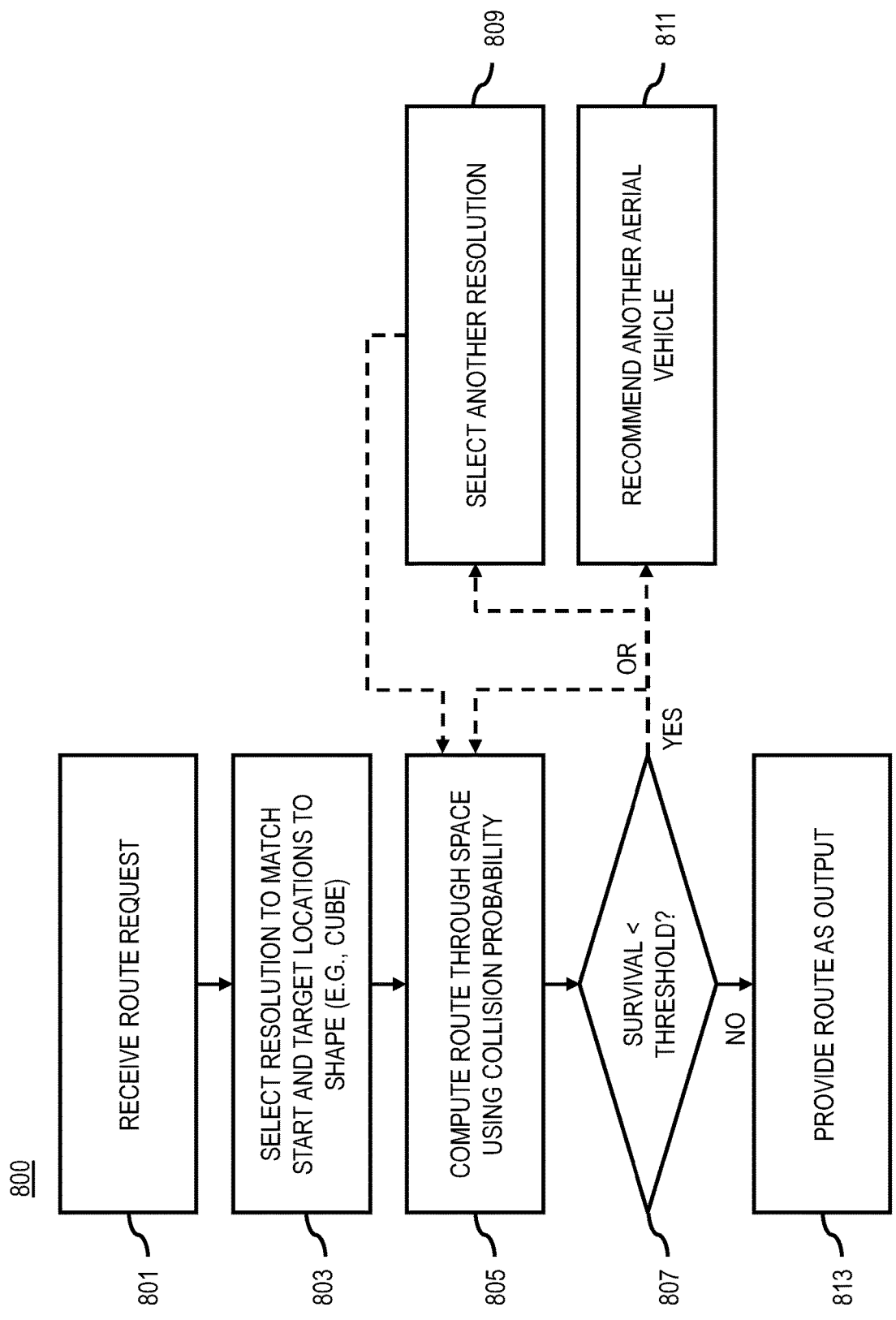
FIG. 8 is a flowchart of a process for calculating an aerial route using a collision probability space, according to one embodiment.

FIG. 8 is a flowchart of a process for calculating an aerial route using a collision probability space, according to one embodiment. In various embodiments, the routing platform 107 and/or any of the modules 201-207 of the routing platform 107 may perform one or more portions of the process 800 and may be implemented in, for instance, a chip set including a processor and a memory as shown in FIG. *\. As such, the routing platform 107 and/or the modules 201-207 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

In step 801 of the process 800, the routing module 203 of the routing platform 107 receives a request to route the aerial vehicle through a 3D space from a start location to a target location. The start and end locations (e.g., START/TARGET) are identified in the X, Y, Z coordinate system described in the embodiments above. In step 803, the routing module 203 picks or selects an arbitrary resolution R size for the map partition and matches the START and TARGET coordinates to the closest respective face of the cubes or other 3D shapes in that resolution. For example, the faces of the cube corresponding to the START or TARGET can be labeled as CUBE_ID_START and CUBE_ID_END.

Figure 9:
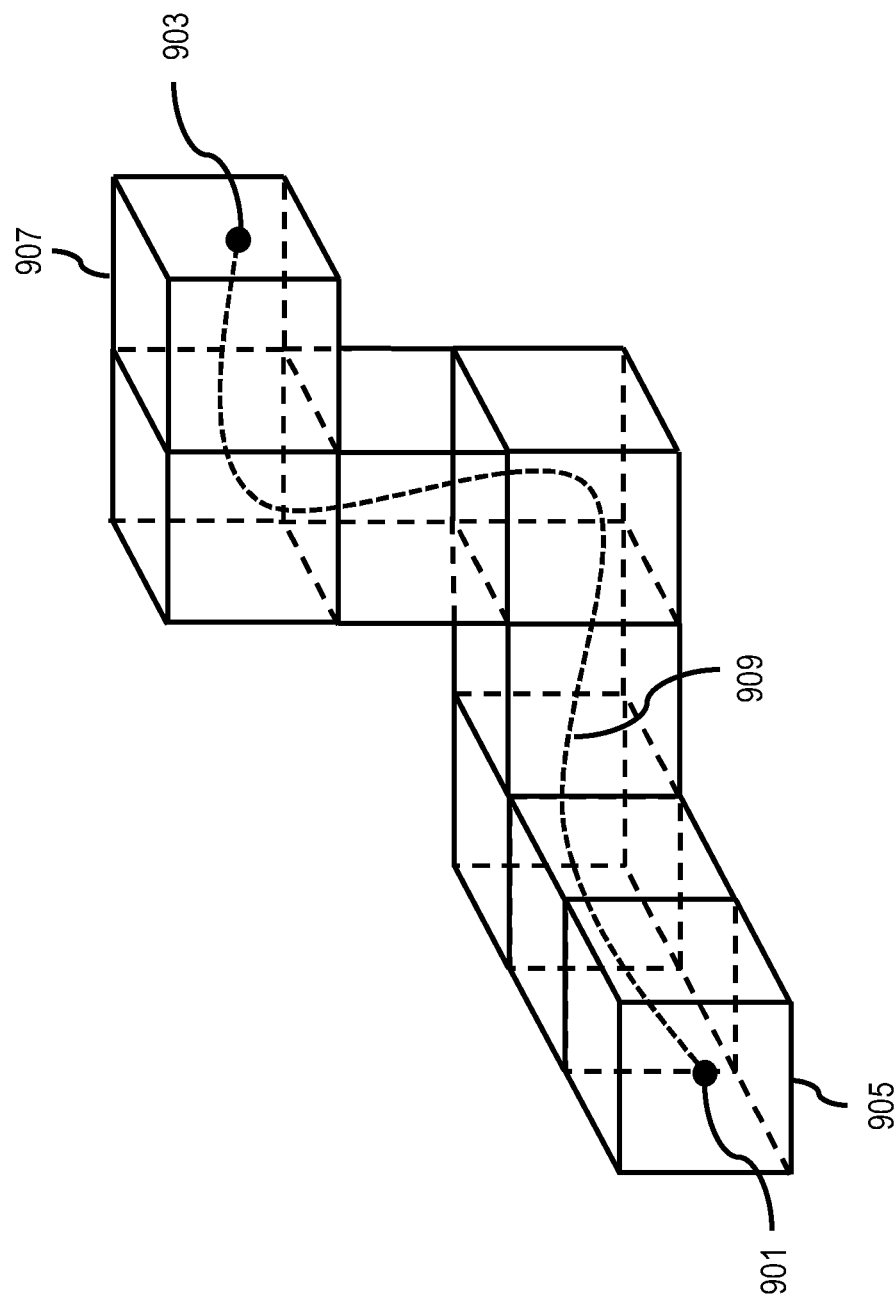
FIG. 9 is a diagram illustrating an example of representing a 3D route as a set of three-dimensional shapes (e.g., cubes or other equivalent 3D shapes), according to one embodiment.

In other words, the routing module 203 matches the start location and the target location specified in the routing request to a corresponding start shape and a target shape representing the 3D space. An example of this matching is illustrated in FIG. 9. As shown, a routing request is received specifying a start location 901 and a target location 903 using an X, Y, X coordinate system common to the requesting device (e.g., the aerial vehicle 101 or the routing client 111) and the routing platform 107. The routing module 203 matches the start location 901 to a corresponding start cube 905 at a selected resolution and matches the target location to a corresponding target cube 907 at the same resolution. It is contemplated that the routing module 203 can the resolution using any process or mechanism such as but not limited to a length of the route, map region, available map data, and/or the like.

In step 805, the routing module 203 then computes a route on the partition network using a modified Dijkstra algorithm or equivalent routing algorithm. The partition network, for instance, refers to the cubes or 3D shapes representing the 3D space in which the route is being computed. The faces of the cubes (or more generally the surfaces of the 3D shapes) of the partition network adjoin to enable the computation of a path the through the network. The routing module 203 uses the modified Dijkstra algorithm or any other equivalent routing algorithm to determine the path or route.

In one embodiment, the routing module 203 computes the route through the plurality of three-dimensional shapes from the start shape to the target shape based on a collision probability determined based on a first probability of survival due to volume-related factors, a second probability of survival due to aerial-vehicle-related factors, or a combination thereof for the plurality of three-dimensional shapes from the start shape to the target shape. For example, the routing module 203 interacts with the collision probability module 205 to determine factors for input into the routing algorithm (e.g., as cost factors). For example, a probability of survival due to cube-related (or shape-related) factors on a given cube i is given by P_survival=1−P_i. In one embodiment, the collision probability module 205 can compute the probability of survival due to shape-related factors (P_survival) from collision probability for the cube or 3D shape from the 3D map of the geographic database 109 (e.g., as described in the embodiments above). In addition, the collision probability module 205 can consider external factors (e.g., real-time contextual factors) associated with the cube or shape including but not limited to wind, historical collision data, weather, visibility, etc.

In addition or alternatively, the collision probability module 205 can compute a second or alternate probability of survival due to intrinsic errors or factors of the aerial vehicle 101 (e.g., battery, wear and tear, etc.). In one embodiment, the probability of survival due to aerial-vehicle-related factors can be given or computed as a function of the number N of cubes or 3D shapes at the current resolution that the aerial vehicle 101 is predicted to traverse before the aerial vehicle 101 is predicted to fail or die because of internal problems due to the one or more intrinsic factors. For a resolution R, the probability of survival due to aerial-vehicle-related factors, for instance, can be denoted as P_traversal and can be calculated as: P_failure=1/N and then P_traversal=1−P_failure.

In one embodiment, the probability of survival after traversing cube i given both factors (e.g., probability of survival due to shape-related factors and probability of survival due to aerial-vehicle-related actors) is P=P_survival*P_traversal. The collision probability module 205 can then compute the cost of expanding a node i in the partition network to include traversal of cube i in a route as −log(P). The routing module 203 hence uses the Dijkstra or equivalent routing algorithm to compute the path or route that minimizes the sum of −log(P) for all cubes or shapes along the path which is equivalent to the path or route that maximizes the product of all P along the route. Thus, this adjustment to the cost computation allows the routing algorithm to maximize the product of survival probability at each cube or shape traversal. This path or route therefore has the highest probability of reaching its destination at the given resolution R. Returning the example of FIG. 9, the route 909 traversing the cubes in between the start cube 905 and target cube 907 has the highest probability of survivability or conversely the lowest probability of collision based on the individual survival probabilities of each of the cubes or shapes traversed by the route 909.

In step 807, if the route computed has a probability of survival that is below a threshold value (e.g., 80%), the routing module 203 can select a different resolution for the map partition or shape representation of the 3D space (step 809). The process 800 then returns to step 805 to compute a route a the newly selected resolution. The threshold probability of survival value can be a system parameter or can be provided in the routing request by the routing client 111. In one embodiment, a lower resolution (e.g., a cube representing a greater volume of the 3D space) or a higher resolution (e.g., a cube representing lesser volume of the 3D space) can be used in an attempt to find a path that meets the target probability of survival threshold value. For example, a lower resolution cube or 3D shape encompassing a larger total volume of space may result in an increase the ratio of unoccupied space to total space, making the collision probability lower. On the other a higher resolution cube or 3D shape may in some cases enable the routing module 203 to find at smaller cube or 3D shape in clear space around an otherwise obstacle dense 3D space.

In one embodiment, the resolution can be selected individually for each different leg of the route. For example, if a traversal through a first cube in the route meets the probability threshold, but the second cube does not, the routing module 203 can select a new resolution for traversing the space corresponding to the second cube while maintaining the original resolution of the first cube.

In step 807, if no route exists with an acceptable survival probability, the routing module 203 can use this expected failure to select another aerial vehicle 101 with higher probability of traversal per cube than the aerial vehicle 101 for which the route was originally computed (step 811). As described above the probability of traversal is a function of both the probability of survival due to cube- or shape-related factors and probability of survival due to aerial-vehicle-related factors. Accordingly, the routing module 203 can recommend or determine another aerial vehicle 101 with a sufficiently high probability of survival due to aerial-vehicle-related factors to increase the overall probability of survival for the cube or shape to meet the threshold survival probability. For example, a heavier duty aerial vehicle 101 or drone with greater range or greater mean time between failure can be selected to complete a route that would otherwise not have an acceptable survival probability.

In another embodiment, the routing module 203 can use the computed survival or collision probability for a given route for other applications including but not limited to selecting an insurance or delivery cost for the aerial vehicle 101 and/or its payload. In this way, the routing module 203 can determine the insurance cost, the delivery cost, and/or the like for the aerial vehicle 101 to fly the route based on the computed collision probability for the route.

Figure 10:
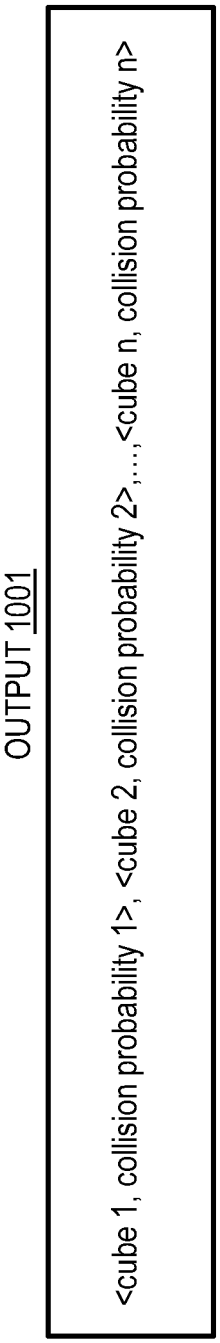
FIG. 10 is a diagram illustrating an example output encoding a route as a set of 3D volumes, according to one embodiment.

In step 813, the output module 207 can encode the computed route, along with the collision probabilities for each cube traversal to send to the aerial vehicle 101, an operator of the vehicle 101, an aerial vehicle service provider, and/or any other designated device or entity. As shown in FIG. 10, encoding the route comprises, for instance, generating an output 1001 that includes an ordered list of the cubes or 3D shapes in the route (e.g., labeled according to the embodiments described above by cube and/or face ID) along with the corresponding collision or survival probability. In the example of FIG. 10, the output 1001 includes a data structure listing the cube by ID and collision probability as data tuples for cubes 1-n of the compute route.

Figure 11:
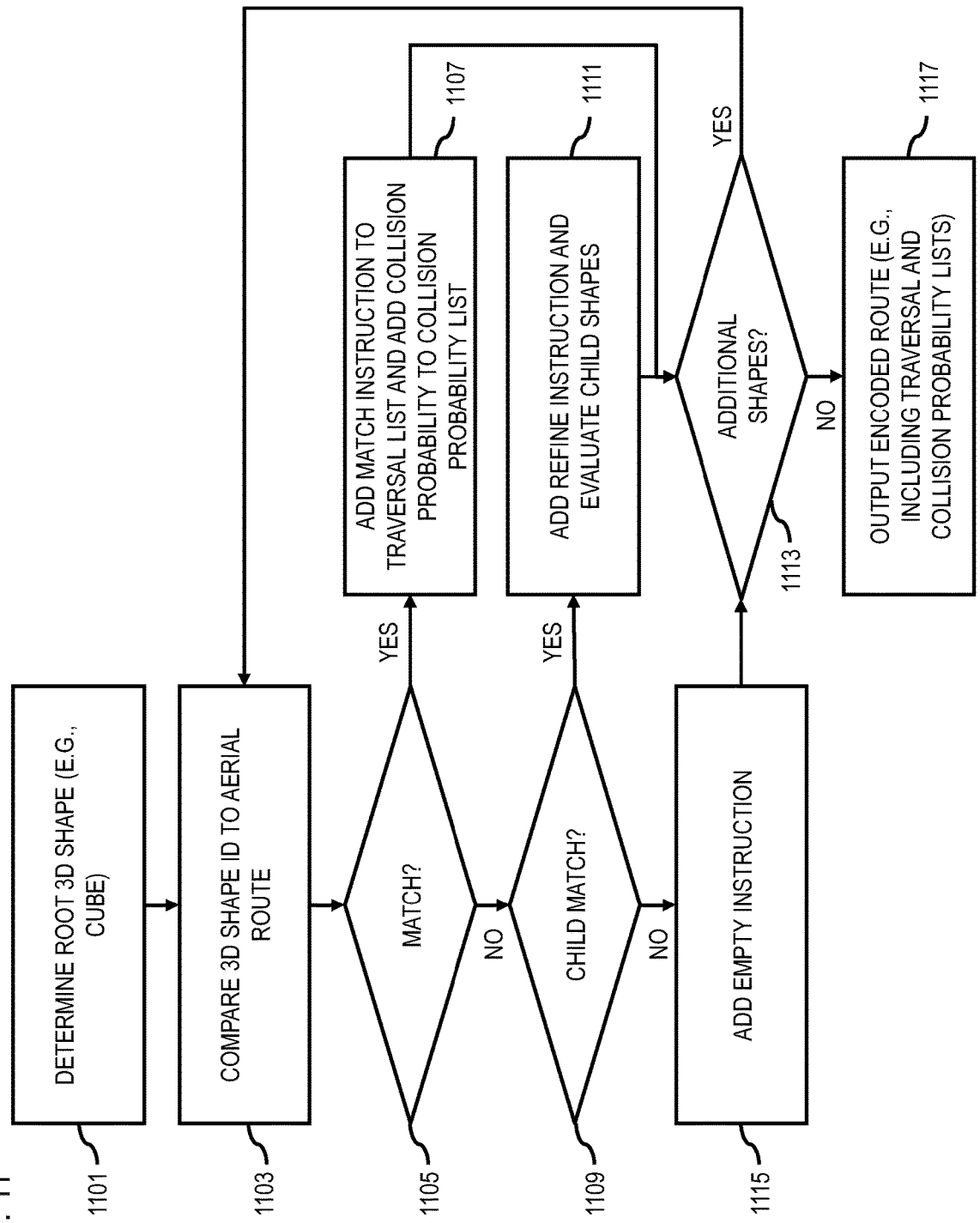
FIG. 11 is a flowchart of a process for encoding an aerial route calculated using a collision probability space, according to one embodiment.
Figure 20:
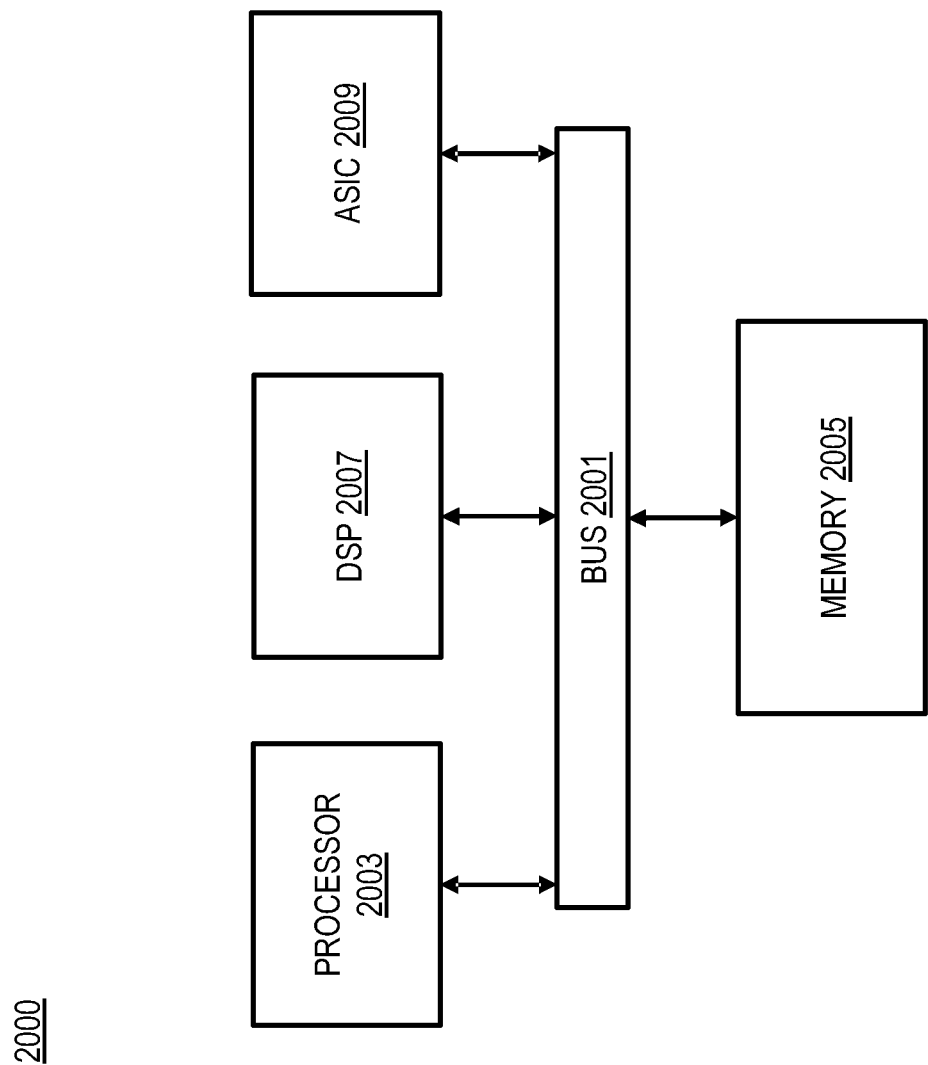
FIG. 20 is a diagram of a chip set that can be used to implement an embodiment.

FIG. 11 is a flowchart of a process for encoding an aerial route calculated using a collision probability space, according to one embodiment. In various embodiments, the routing platform 107 and/or any of the modules 201-207 of the routing platform 107 may perform one or more portions of the process 1100 and may be implemented in, for instance, a chip set including a processor and a memory as shown in FIG. 20. As such, the routing platform 107 and/or the modules 201-207 can provide means for accomplishing various parts of the process 1100, as well as means for accomplishing embodiments of other processes described herein in conjunction with other components of the system 100. Although the process 1100 is illustrated and described as a sequence of steps, its contemplated that various embodiments of the process 1100 may be performed in any order or combination and need not include all of the illustrated steps.

In one embodiment, the routing process 800 of FIG. 8 on a 3D space partitioned as described above, would return an ordered list of cubes or other 3D shapes to be traversed from a given location to a destination (e.g., as illustrated in the example of FIG. 10). Given the hierarchical nature of the partitioning of the 3D space, the path may be composed of cubes or other 3D shapes at different levels of resolution, e.g., expanding over areas with low and uniform traversal risk, and shrinking in areas where specific areas of risk can be avoided.

The various embodiments of the process 1100 for encoding an aerial route take advantage of the hierarchical nature of the partition to encode a route as a tree traversal over the hierarchical space with instructions on where to go at each node of the tree. In one embodiment, the instructions include but are not limited to any combination of the following:
  MATCH: flag the current cube as part of the route;
  REFINE: drill into one level deeper of the current cube; and
  EMPTY: skip the current cube, as it is not part of the path.

Then, given a route R, composed of an ordered list of cube or 3D shape IDs and their collision probabilities, the routing module 203 of the routing platform 107 can begin encoding the route. For example, the routing module 203 can initialize an empty list of traversal commands T and initialize an empty list of the cube collision probabilities C. In step 1101, the routing module 203 determines a root 3D shape or cube encompassing an aerial route through a 3D space. As noted, the 3D space is partitioned into a hierarchy of 3D shapes at different resolutions, and the aerial route comprises a list of 3D shape IDs corresponding to one or more of the 3D shapes in the hierarchy that form the aerial route. In other words, the routing module 203 starts at a designated resolution level (e.g., level 0 or resolution that covers the most volume of 3D space or otherwise covers the 3D space around the aerial route being encoded), and performs a depth-first walk of the partition hierarchy and encodes the route R.

Figure 12:
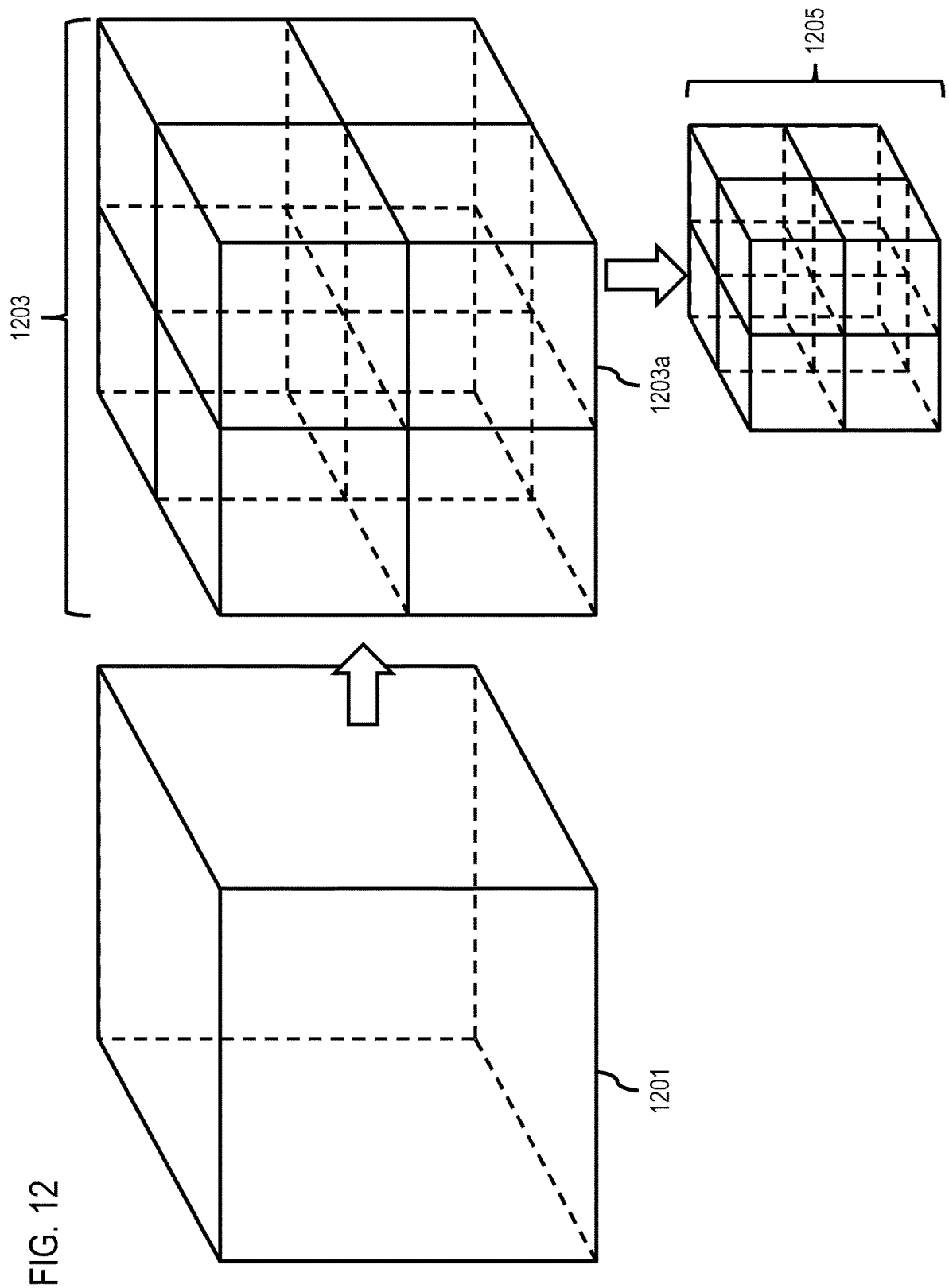
FIG. 12 is diagram illustrating an example of a hierarchical partitioning of a 3D space for encoding an aerial route, according to one embodiment.

FIG. 12 is diagram illustrating an example of a hierarchical partitioning of a 3D space for encoding an aerial route, according to one embodiment. As shown, a root cube 1201 is selected an initial resolution. Depending on the extent of the aerial route and the collision probabilities or traversal probability of survival, the route can include cubes or 3D shapes at different resolutions so that portions of the route can be defined with a cubes representing a larger bounding volume of 3D space in areas of relatively low collision probability and cubes representing smaller bounding volumes in areas with higher collision probabilities (e.g., to enable the route to more finely avoid high risk areas). Accordingly, the initial root cube can be segment into 8 equal child cubes 1203. Depending on the respective collision probabilities of child cubes 1203, one or more of the child cubes 1203 can be further partitioned. For example, child cube 1203a can be further sub-divided into 8 additional child cubes 1205, while the other 7 child cubes 1203 at the same resolution level as child cube 1203a are not further partitioned. In general, for partitions based on cubes, each parent cube can be partitioned in 8 child cubes of equal size. This process can continue until a designated maximum resolution or level is reached.

Based on this depth-first walk through the resolution hierarchy of 3D shapes, in step 1103, the routing module 203 recursively performs a comparison of a respective 3D shape ID of the root 3D shape or one or more child shapes of the root 3D shape to the list of 3D shape IDs of the aerial route to generate a traversal command list by selectively adding each of the respective 3D shape ID to the traversal command list that matches or does not match at least one 3D shape ID of the aerial route or includes the least one shape ID of the aerial route as a child 3D shape ID.

More specifically, in one embodiment, the routing module 203 initializes an empty list of traversal commands T and an empty list of shape (e.g., cube) collision probabilities C. The routing module 203 then implements an encoding function (ENCODE) with the shape ID (e.g., CUBE-ID) as a function parameter according to the following:
  ENCODE(CUBE-ID)
    If CUBE-ID equals to any of the CUBE-IDs in aerial route R, e.g., one of the cubes in R has the same bounding volume as the cube denoted by CUBE-ID (step 1105):
      Add instruction of MATCH is added to the traversal command list T (step 1107);
      The collision probability of the current cube is added to the collision probability list C (step 1107); and
      RETURN from the function.
    Else if any of the CUBE-IDs in R is a descendant or child ID of CUBE-ID, e.g., the bounding volume of at least one of the cubes in R is inside the bounding volume of the cube denoted by CUBE-ID (step 1109):
      Add instruction of REFINE is added to the traversal command list T (step 1111).
      Loop over all eight child IDs CHILD-ID of CUBE-ID (step 1113):
        Recursively call ENCODE(CHILD-ID) (e.g., returning to 1103 for each CHILD-ID); and
      RETURN from the function.
    Else:
      Add instruction of EMPTY is added to the T (step 1115).
      RETURN from the function.

In summary, the routing module 203 uses the encoding function, ENCODE(CUBE-ID), to generate a traversal command list by: (1) adding an instruction in the traversal command list to flag the respective 3D shape ID as part of the aerial route based on a comparison indicating the respective 3D shape ID matches the at least one shape ID of the aerial route (e.g., a MATCH instruction); (2) adding an instruction in the traversal command list to drill into one level deeper of the root 3D shape or a currently compared 3D shape based on the comparison indicating that the respective 3D shape ID includes the least one 3D shape ID of the aerial route as the child 3D shape ID (e.g., a REFINE instruction); and (3) adding an instruction in the traversal command list to indicate that the respective 3D shape ID is empty based on the comparison indicating that the respective 3D shape ID does not match the at least one 3D shape ID of the aerial or does not include the at least one 3D shape ID of the aerial route as the child 3D shape ID (e.g., an EMPTY instruction). In one embodiment, at the same time, the routing module 203 generates a collision probability list by adding said each of the respective 3D shape IDs that matches the least one 3D shape ID of the aerial route and a corresponding collision probability to the collision probability list. The collision probability data, for instance, is included in (e.g., during the route generation process) and therefore, determined from the aerial route.

After the routing module 203 generates the traversal command list T and/or collision probability list C as described in the embodiments above, the output module 207 can encode the traversal command list T and/or collision probability list C for transmission to a routing client. It is contemplated that the output module can use any binary encoding scheme or mechanism. For example, in one embodiment, the output module 207 can use a binary representation of one or more traversal instructions included in the traversal command list as part of the encoding scheme. Given that in one embodiment, there are three possible decisions or instructions to make, they could for example be encoded into 1.5 bits. As described above, the traversal instructions include but are not limited to a first instruction indicating no match between the respective 3D shape ID and the at least one 3D shape ID of the aerial route (e.g., EMPTY), a second instruction indicating that the 3D shape ID includes the at least one 3D shape ID of the aerial route as the child 3D shape ID (e.g., REFINE), and a third instruction indicating that the respective 3D shape ID and the at least one 3D shape ID of the aerial route match (e.g., MATCH). Thus, in one embodiment, the traversal command list T can be encoded as a variable-length bit array.

It is noted that EMPTY is the most likely command. Therefore, in one embodiment, the output module 207 can a simple Huffman or equivalent encoding for T:
EMPTY as 0;
REFINE as 10; and
MATCH as 11.

Figure 13:
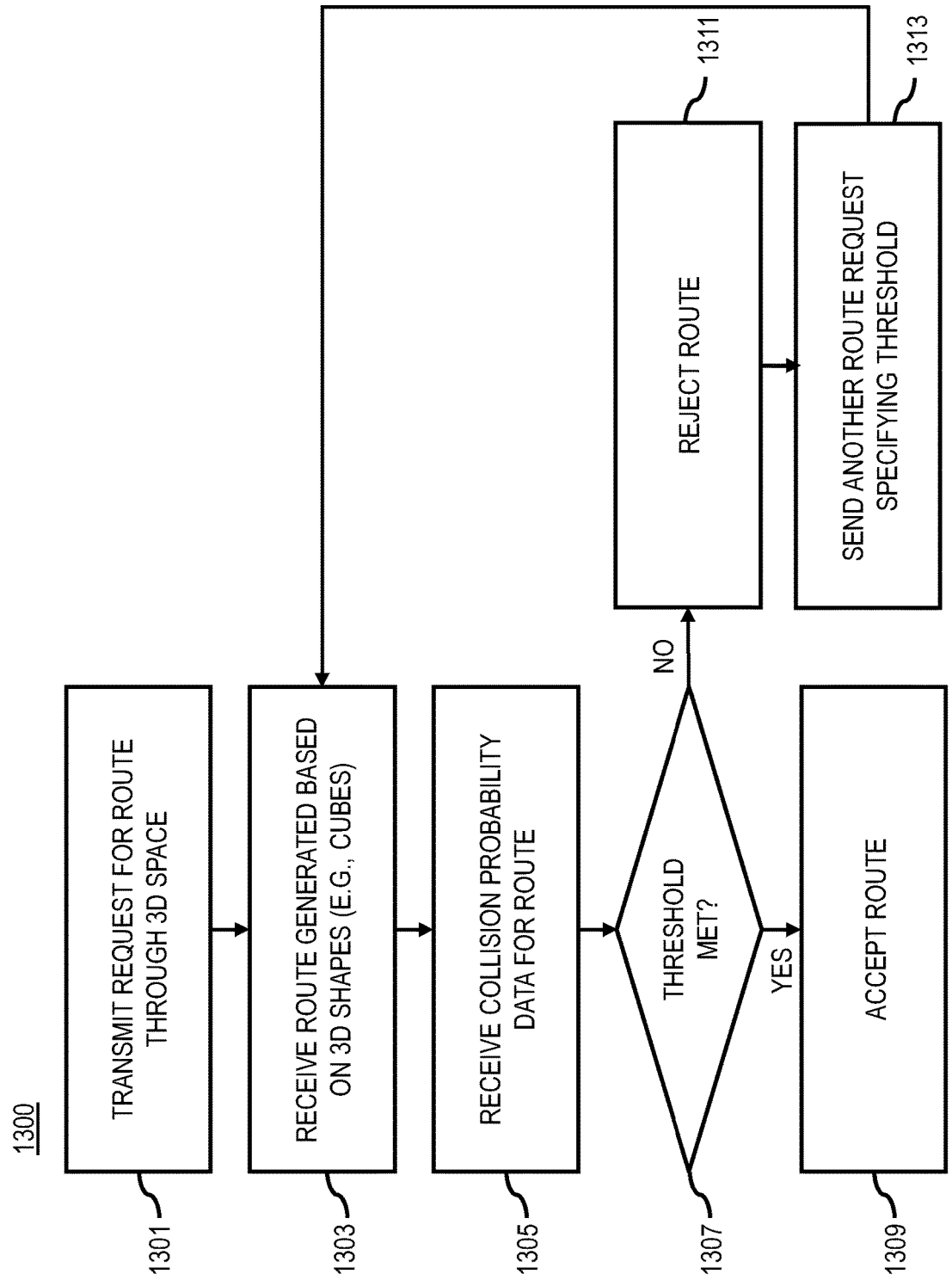
FIG. 13 is a flowchart of a process for receiving an aerial route calculated based on a collision probability space, according to one embodiment.

FIG. 13 is a flowchart of a process for receiving an aerial route calculated based on a collision probability space, according to one embodiment. In various embodiments, the routing client 111 and/or any of the modules 201-207 of the routing client 111 may perform one or more portions of the process 1300 and may be implemented in, for instance, a chip set including a processor and a memory as shown in FIG. 20. As such, the routing client 111 and/or the modules 201-207 can provide means for accomplishing various parts of the process 1300, as well as means for accomplishing embodiments of other processes described herein in conjunction with other components of the system 100. Although the process 1300 is illustrated and described as a sequence of steps, its contemplated that various embodiments of the process 1300 may be performed in any order or combination and need not include all of the illustrated steps.

In step 1301, the routing module 203 of the routing client 111 transmits a request to the routing platform 107 by encoding a start location and a target location in the X, Y, Z coordinate system common to both the routing client 111 and routing platform 107 as described in the embodiments above.

In response to the routing request, the routing module 203 receives an aerial route generated based on collision probability/probability of survival according to embodiments of the process 300 of FIG. 3 (step 1303). For example, the route matches the start location and the target location specified in the request respectively to a start shape (e.g., start cube) and target shape (e.g., target cube) of the 3D shapes representing the 3D space. The route would then comprise the start shape, the target shape, and a set of the plurality of three-dimensional shapes traversing from the start shape to the target shape. The routing module 203 also receives collision probability data for cubes or 3D shapes in the route (step 1305). The route, for instance, is an encoded ordered list of cube ids (or other 3D shape IDs) and their collision probability as illustrated in FIG. 10. In one embodiment, the collision probability is computed as a probability of survival based on both cube-related and aerial-vehicle related factors that represents the likelihood of a successful traversal of the corresponding cube or 3D shape.

In step 1307, the routing module 203 of the routing client 111 checks the expected probability of survival for the route and may choose to reject or to accept the route by comparing the probability of survival to a threshold value. In step 1309, based on determining that the probability of survival of the route meets or exceeds the threshold value, the routing module 203 can accept the route. In one embodiment, on acceptance of the route, the routing module 203 can configure the aerial vehicle 101 to operate or follow the route as described with respect to the process 1000 of FIG. 10 below.

In step 1311, based on determining that the probability of survival of the received route is not acceptable (e.g., is below the designated survival probability threshold), the routing module 203 can reject the received route. Then, in step 1313, the routing module 203 can transmit a request for another route with a probability threshold hint. In other words, the routing module 203 can specify the desired or acceptable probability threshold for the routing platform 107 to use when computing the route. Alternatively, the routing client 203 can include the probability threshold hint in the initial routing request. After returning to step 1303 and receiving the new route, the routing module 203 can reevaluate the probability of survival of the new route for acceptability and repeat the process until and acceptable route is received or no further routes are available from the routing platform 107 that meet the probability threshold.

In one embodiment, after accepting the route generated by the routing platform 107, the routing client 111 can configure an aerial vehicle 101 to perform the route according to FIG. 14 below.

Figure 14:
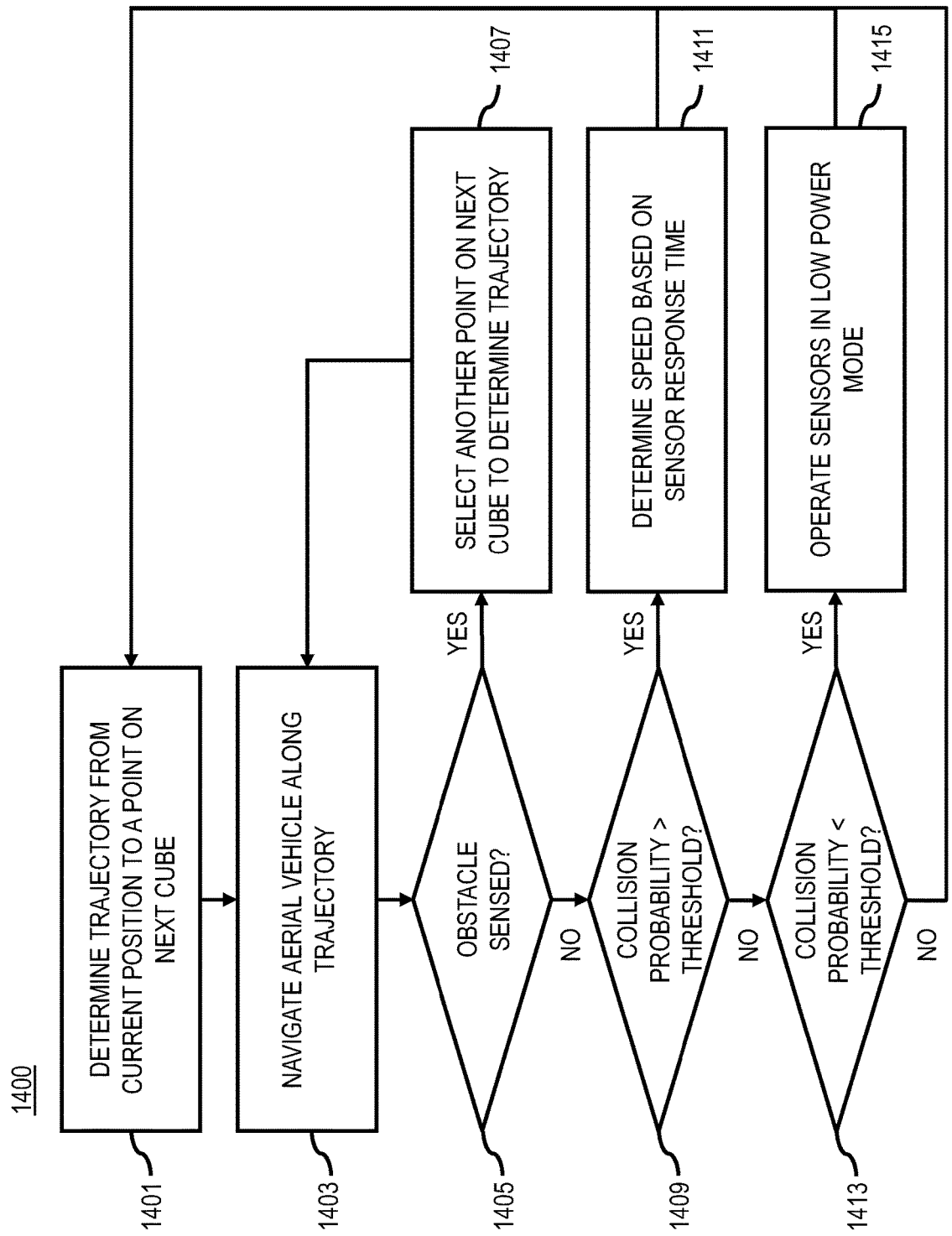
FIG. 14 is a flowchart of a process for using an aerial route calculated based on a collision probability space, according to one embodiment.

FIG. 14 is a flowchart of a process for using an aerial route calculated based on a collision probability space, according to one embodiment. In various embodiments, the routing client 111 and/or any of the modules 201-207 of the routing client 111 may perform one or more portions of the process 1400 and may be implemented in, for instance, a chip set including a processor and a memory as shown in FIG. 20. As such, the routing client 111 and/or the modules 201-207 can provide means for accomplishing various parts of the process 1400, as well as means for accomplishing embodiments of other processes described herein in conjunction with other components of the system 100. Although the process 1400 is illustrated and described as a sequence of steps, its contemplated that various embodiments of the process 1400 may be performed in any order or combination and need not include all of the illustrated steps.

Figure 15:
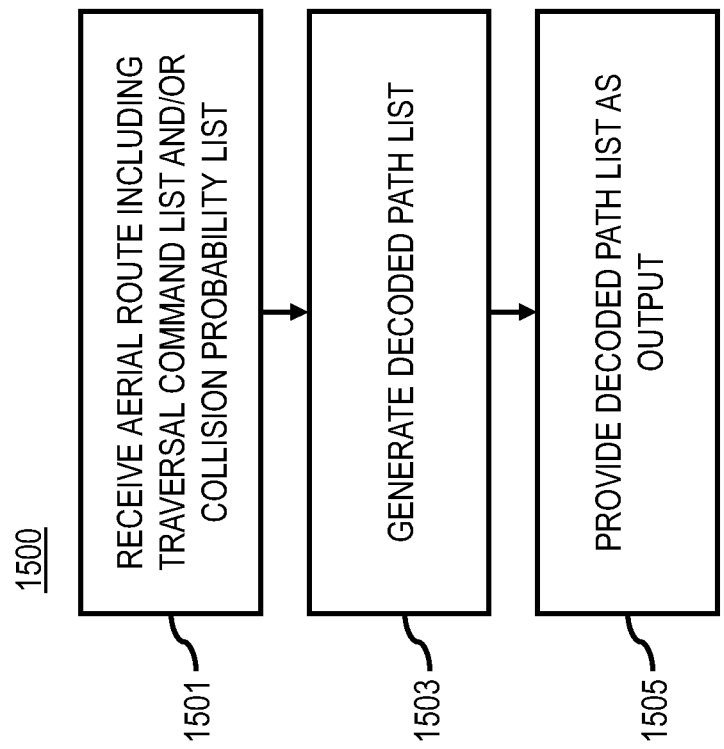
FIG. 15 is a flowchart of a process for decoding an aerial route calculated using a collision probability space, according to one embodiment.

The process 1400 can be performed after the routing client 111 of an aerial vehicle 101 has received an aerial route according to the embodiments described herein (e.g., according to embodiments of the process 1300 of FIG. 13). In one embodiment, the aerial route may be encoded by the routing platform according to the embodiments of the process 1100 of FIG. 11 above based on generating a traversal command list and/or a collision probability list using a hierarchical partitioning of 3D space encompassing the aerial route. FIG. 15 is a flowchart of a process for decoding an aerial route calculated using a collision probability space, according to one embodiment. In various embodiments, the routing client 151 and/or any of the modules 201-207 of the routing client 151 may also perform one or more portions of the process 1500.

As described above, the embodiments of the process 1100 of FIG. 11 for encoding an aerial route takes advantage of the hierarchical nature of the partitioning of the 3D space to encode a route as a tree traversal with instructions on where to go at each node of the tree. The instructions include but are not limited to:

MATCH: flag the current cube or 3D shape as part of the route;

REFINE: drill into one level deeper of the current cube or 3D shape; and

EMPTY: skip the current cube or 3D shape, as it is not part of the path.

In step 1501, the routing module 203 of the routing client 111 receives an aerial route through 3D space. The 3D space is partitioned into a hierarchy of 3D shapes (e.g., cubes), and the aerial route includes a traversal command list of 3D shape IDs corresponding to one or more of the 3D shapes in the hierarchy associated with the aerial route and a respective traversal instruction for each of the 3D shape IDs in the traversal command list. In addition, the aerial list can also include a collision probability list indicating collision probability data for the cubes or 3D shapes in the aerial route. In other words, on receiving the encoded aerial route based on this scheme, the routing module 203 will have a list of traversal commands or instructions T and a list of cube/shape collision probabilities C.

In step 1503, the routing module 203 generates a decoded path list P by selectively adding said each of the 3D shape IDs in the traversal command list T to the path list based on the respective traversal instruction. The routing module 203 can begin by initializing an empty decoded path list P<-{ }. Then, in one embodiment, starting at a resolution level 0 or other designated resolution (e.g., at the root cube or 3D shape), the routing module 203 performs a depth-first walk of the partition hierarchy by following the instructions in the traversal command list T. In one embodiment, the depth-first walk can be performed using a decoding function (DECODE) with the CUBE-ID of the root cube or 3D shape according to the following example pseudo-functions:

```
HEAD(L): Returns the first element of a list L
TAIL(L): Returns a sublist of a list L, from its second element to its last
element.
DECODE(CUBE-ID, T, P)
• If HEAD(T) = EMPTY
    ○ Return TAIL(T), P
• Else If HEAD(T) = MATCH
    ○ Return TAIL(T), P + {CUBE-ID}
• Else if HEAD(T) = REFINE
    ○ T_current <-TAIL(T)
    ○ P current <- P
    ○ Loop over all eight child IDs CHILD-ID of CUBE-ID
        ■        Recursively call T_current, P_current <-
                 DECODE(CHILD-ID ,
                 T_current, P_current)
    ○ Return        T_current, P_current
```

When the DECODE function terminates, the decoded path is contained in the decoded path list P. In one embodiment, the routing module 203 can also match the 3D shape IDs (elements) in the decoded path list P to collision probability data of the collision probability list C. For example, the probability of collision for the ith element in the decoded path list P is the ith element in the collision probability list C.

In one embodiment, the routing module 203 can also determine a traversal order for the decoded path list by appending the 3D shapes in the decoded path list P based on identifying common faces between the 3D shapes. In other words, the correct order of traversal for the cubes or 3D shapes in P can be derived. Given that the path is constructed of adjacent cubes or 3D shapes from the route start to finish, the order of traversal can be reconstructed by appending cubes or shapes where adjoining cubes or shapes share common faces. In addition or alternatively, the routing module 203 can sort or order the cubes or 3D shapes in the decoded path list based on their distance from the starting location or to the destination (e.g., from closest to furthest from destination) and/or any other equivalent sorting process. In step 1105, the output module 207 can then provide decoded and ordered path list P as an output for an aerial vehicle to plan a route through the decoded path, e.g., taking into account collision probability for each cube or 3D shape in the aerial route as given by the collision probability C to control flight parameters (e.g., modulate flying speed) or perform related functions (e.g., activate or deactivate onboard sensors used for obstacle detection) as discussed in more detail below.

Returning to the process 1400 of FIG. 14, in one embodiment, to follow the cube path (e.g., the ordered list of 3D shapes representing the route) defined by the routing platform 107, the routing client 111 can further decode a series of trajectories from the received or decoded route to navigate the aerial vehicle 101. For example, the routing module 203 can navigate or initiate a movement of the aerial vehicle 101 from its current position using a cube-by-cube or shape-by-shape approach.

Accordingly, in step 1401, the routing module 203 determines or computes a trajectory from the current position of the aerial vehicle 101 to a point on the next cube or 3D shape in the route. In one embodiment, the point on the face of the next cube or 3D shape can be the closest point on the face of the next cube. However, it is contemplated that routing module 203 can use any process or mechanism (e.g., point in the center of the adjoining face of the next cube) for selecting the point on the next cube or 3D shape, and the point need not be the closest point. In one embodiment, the trajectory is a straight line between the current point and the point on the next cube or 3D shape.

Figure 16:
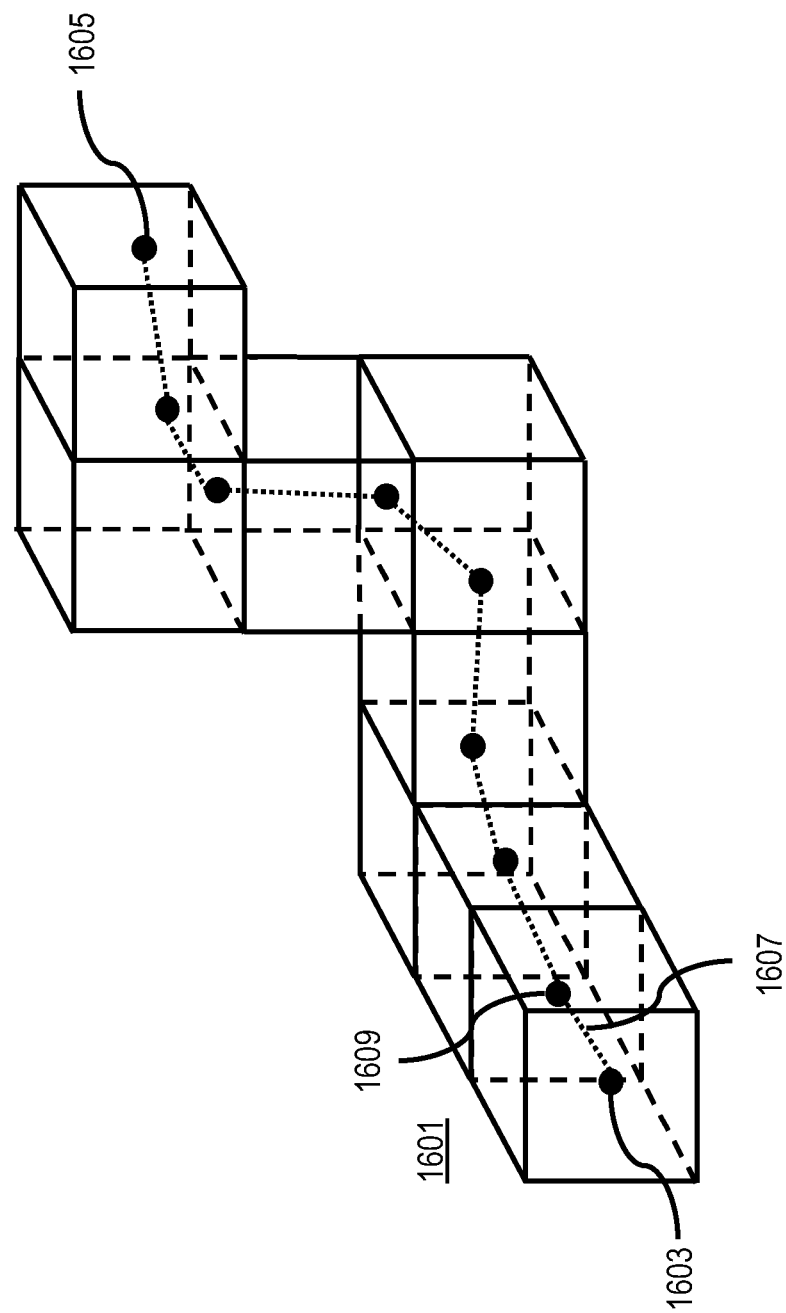
FIG. 16 is a diagram illustrating an example of constructing trajectories of an aerial route, according to one embodiment.

FIG. 16 is a diagram illustrating an example of constructing trajectories of an aerial route, according to one embodiment. In this example, a route 1601 from a start location 1603 to a target location 1605 is received by the routing client 111 from the routing platform 107 as a sequence of cubes. The current position of the aerial vehicle 101 is at the start location 1603, and the routing module 203 computes a trajectory 1607 from the start location 1603 to a point 1609 on the face of the next cube in the route 1601. Respective trajectories traversing each subsequent cube until the target location 1605 is reached can then be calculated.

Figure 17:
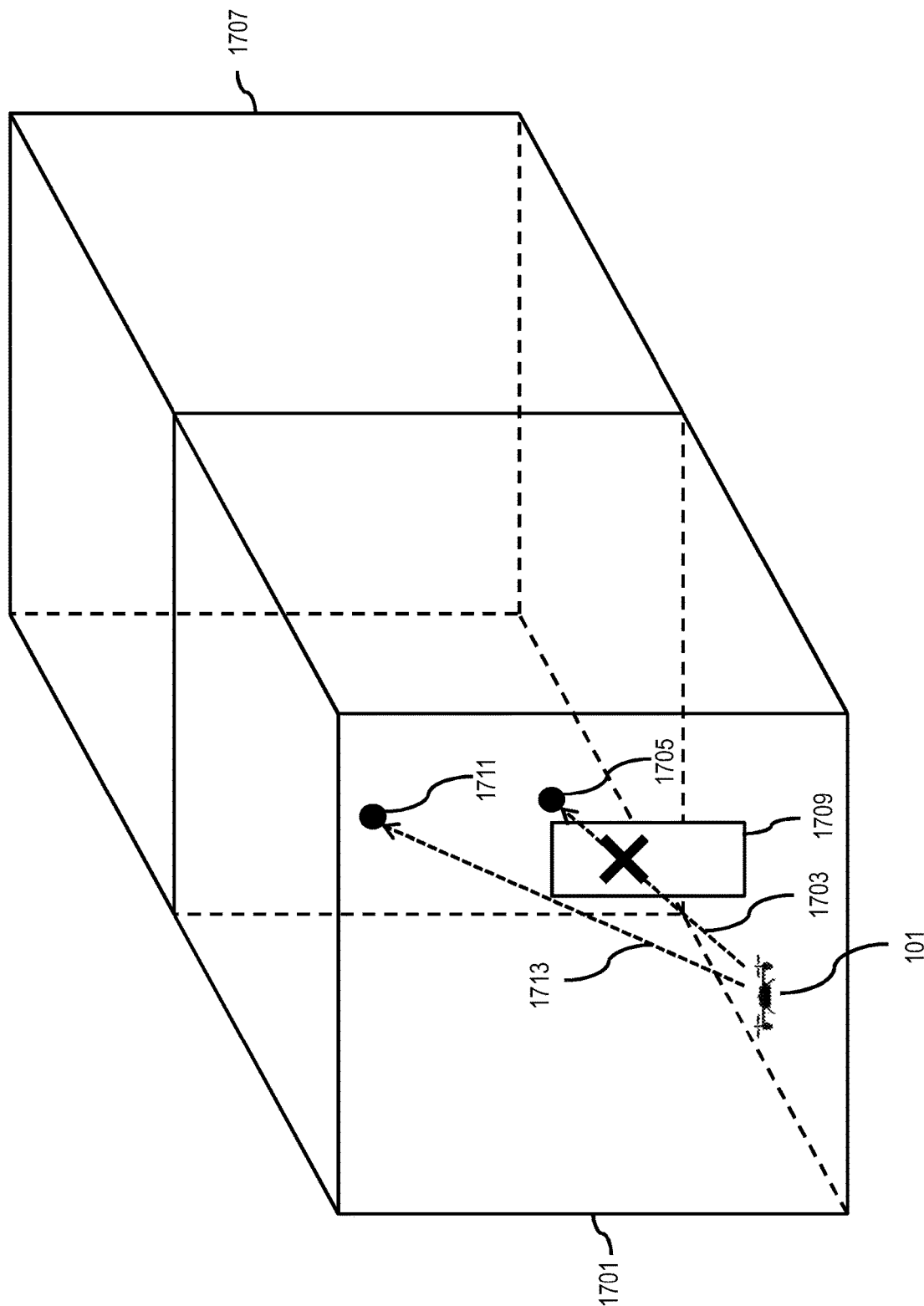
FIG. 17 is a diagram illustrating an example of re-calculating a trajectory in a 3D volume based on a sensed obstacle, according to one embodiment.

In step 1403, the routing module 203 initiates a movement of the aerial vehicle 101 along the computed trajectory. As the aerial vehicle 101 moves along the trajectory, one or more onboard sensors of the aerial vehicle 101 can be activated to detect any potential obstacles blocking the path along the trajectory. In step 1405, the routing module 203 determines whether any obstacles are sensed. In step 1407, if obstacles in the trajectory are detected by onboard sensors, the path is adjusted by moving around the obstacle and selecting a new destination on the next cube face. FIG. 17 illustrates an example of an aerial vehicle 101 that is traversing cube 1701 by flowing an initial trajectory 1703 computed from the aerial vehicle 101's current location to a closest point 1705 on the face of the next cube 1707. However, onboard sensors of the aerial vehicle 101 detect the presence of an obstacle 1709 in way of the initial trajectory 1703. In response, the routing client 111 of the aerial vehicle 101 selects another point 1711 on face of the next cube 1707 to determine another trajectory 1713 to navigate around the obstacle 1709.

In one embodiment, the routing client 111 can use the probability of survival given for each leg or cube of its route by modulating its speed. For example, in step 1009, the routing module determines whether the collision probability is greater than a threshold (or with the probability of survival is less than a threshold) for a given cube or leg of the route. In step 1011, based on determining that the collision probability is greater than the threshold, the routing module 203 can navigate along the higher risk leg by lowering the speed of the aerial vehicle 101 to allow for a higher response time from onboard sensors of the aerial vehicle 101. In other words, the routing module 203 can navigate the aerial vehicle 101 along the trajectory through the higher risk area at a speed determined based on a response time of an onboard sensor of the aerial vehicle 101 that is used for obstacle detection.

In one embodiment, the routing module 203 can also determine whether the collision probability of a cube or 3D shape is below a threshold value (e.g., indicating that there is relatively low risk in traversing the cube) (step 1013). For example, the threshold can be set so that probabilities below the threshold indicate that the cube is risk-free (e.g., open-air spaces). In step 1015, based on determining that the collision probability is below the threshold, the routing module 203 can operate one or more onboard sensors of the aerial vehicle 101 in a low-power mode to save on battery life. In addition or alternatively, the routing module 203 can increase the navigation speed of the aerial vehicle 101 through the cube.

In one embodiment, once the aerial vehicle 101 reaches the target cube or 3D shape in which the target location is located, the routing module 203 can configure the aerial vehicle 101 to onboard sensors while navigating in the target cube or 3D shape to accurately navigate to the X, Y, Z coordinates of the target location with the target cube.

Returning to FIG. 1, as shown, the system 100 comprises an aerial vehicle 101 equipped with a variety of sensors that can be used for navigation, obstacle detection, and/or other flight functions. In one embodiment, the aerial vehicle 101 can fly or otherwise operate autonomously or under direct control via the UE 113 that may include or be associated with one or more software applications 115 supporting routing based on collision probability according to the embodiments described herein. As previously discussed, the system 100 further includes routing platform 107 coupled to the geographic database 109, wherein the routing platform 107 performs the functions associated with providing aerial routes based on a collision probability space according to the various embodiments described herein. In one embodiment, the aerial vehicle 101, routing platform 107, UE 113, and other components of the system 100 have connectivity to each other via the communication network 121.

In one embodiment, the aerial vehicle 101 is capable of operating autonomously or via a remote pilot using UE 113 to fly the aerial vehicle 101 or configure a flight path or route for the aerial vehicle 101. In one embodiment, the aerial vehicle 101 is configured to travel using one or more modes of operation through a 3D space represented as cubes or other 3D shapes. The aerial vehicle 101 may include any number of sensors including cameras, recording devices, communication devices, etc. By way example, the sensors may include, but are not limited to, a global positioning system (GPS) sensor for gathering location data based on signals from a positioning satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The aerial vehicle 101 may also include recording devices for recording, storing, and/or streaming sensor and/or other telemetry data to the UE 113 and/or the routing platform 107 for mapping or routing.

In one embodiment, the aerial vehicle 101 is capable of being configured with and executing at least one route based on a collision probability space according to the embodiments described herein. The aerial vehicle 101 can also be configured avoid areas with high risk levels, populated areas, objects, and/or obstructions. In addition, the aerial vehicle 101 can be configured to observe restricted paths or routes. For example, the restricted paths may be based on governmental regulations that govern/restrict the path that the aerial vehicle 101 may fly (e.g., Federal Aviation Administration (FAA) policies regarding required distances between objects). In one embodiment, the system 100 may also take into account one or more pertinent environmental or weather conditions (e.g., rain, water levels, sheer winds, etc. in and around underground passageways and their entry/exit points) in determining a route or flight path.

In one embodiment, the aerial vehicle 101 may determine contextual information such as wind and weather conditions in route that may affect the aerial vehicle 101's ability to follow the specified route and then relay this information in substantially real-time to the system 100. In one embodiment, the aerial vehicle 101 may request one or more modifications of the flight path based, at least in part, on the determination of the contextual information or a change in the real-time calculated risk levels over areas of interest (e.g., newly detected or updated risk factors causing a sudden and unexpected change in risk levels). In one embodiment, the system 100 creates a data object to represent the aerial route and may automatically modify the route data object based on receipt of the contextual information from the aerial vehicle 101 or another source and then transmit the new route object to the aerial vehicle 101 for execution. In one embodiment, the aerial vehicle 101 can determine or access the new route data object and/or determine or access just the relevant portions and adjust its current path accordingly. For example, if multiple highly dense population areas (e.g., buildings) are encountered, the system 100 may condense the width of the aerial vehicle 101's flight path to better ensure that the aerial vehicle 101 will avoid the closely situation population-dense areas.

By way of example, a UE 113 is any type of dedicated aerial vehicle control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 113 can support any type of interface to the user (such as "wearable" circuitry, etc.). In one embodiment, a UE 113 may support any type of interface for piloting or routing the aerial vehicle 101. In addition, a UE 113 may facilitate various input means for receiving and generating information, including, but not restricted to, a touch screen capability, a keyboard and keypad data entry, a voice-based input mechanism, and the like. Any known and future implementations of a UE 113 may also be applicable.

By way of example, the UE 113 and/or the aerial vehicle 101 may execute applications 115, which may include various applications such as an aerial routing application, a location-based service application, a navigation application, a content provisioning application, a camera/imaging application, a media player application, an e-commerce application, a social networking application, and/or the like. In one embodiment, the applications 115 may include one or more feature applications used for providing aerial routes based on a collision probability space according to the embodiments described herein. In one embodiment, the application 115 may act as a client for the routing platform 107 and perform one or more functions of the routing platform 107 alone or in combination with the routing platform 107. In one embodiment, an application 115 may be considered as a Graphical User Interface (GUI) that can enable a user to configure a route or flight path for execution by aerial vehicle 101 according to the embodiments described herein.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the routing platform 107 can interact with the services platform 117 to receive data for providing routing or operation of the aerial vehicle 101 based on dynamic collision probability determination. By way of example, the services platform 117 may include one or more services 119 or interact with one or more content providers 123*a*-123*m* for providing content services, provisioning services, application services, storage services, mapping services, navigation services, contextual information determination services, location-based services, information-based services (e.g., weather), etc. In one embodiment, the services platform 117 may interact with the aerial vehicle 101, UE 113, and/or routing platform 107 to supplement or aid in providing aerial routing based on a collision probability space.

By way of example, the aerial vehicle 101, UE 113, routing platform 107, and the services platform 117 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 18:
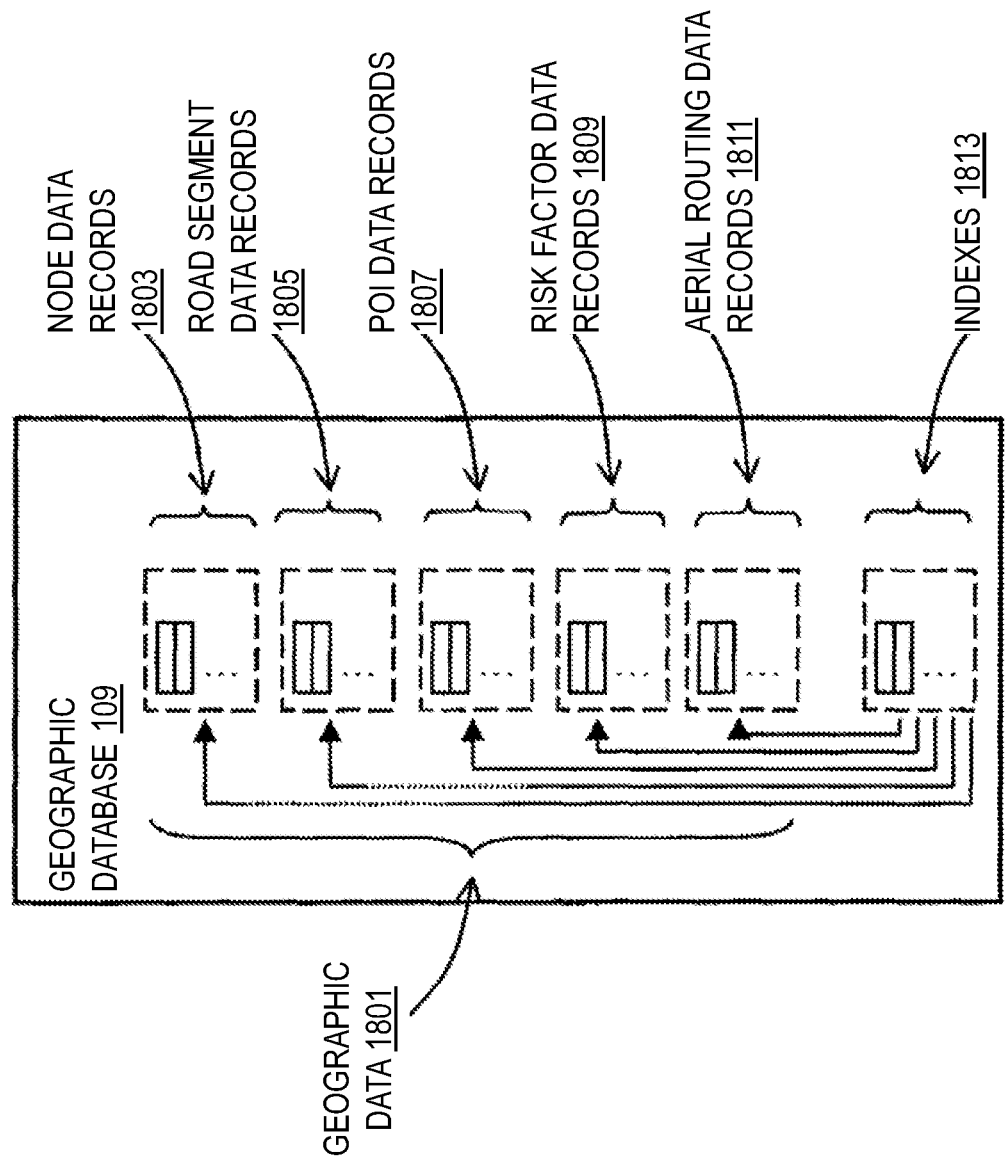
FIG. 18 is a diagram of a geographic database capable of storing map data for underground/interior drone routing, according to one embodiment.

FIG. 18 is a diagram of a geographic database 109, according to one embodiment. In one embodiment, the geographic database 109 includes geographic data 1801 used for (or configured to be compiled to be used for) mapping and/or navigation-related services, such as for routing aerial vehicles based on population density data to create a 3D flightpath or route.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 1801 of the database 109 includes node data records 1803, road segment or link data records 1805, POI data records 1807, risk factor data records 1809, aerial routing data records 1811, and indexes 1813, for example. More, fewer or different data records can be provided. In one embodiment, additional data records (not shown) can include cartographic ("carto") data records, routing data, and maneuver data. In one embodiment, the indexes 1813 may improve the speed of data retrieval operations in the geographic database 109. In one embodiment, the indexes 1813 may be used to quickly locate data without having to search every row in the geographic database 109 every time it is accessed. For example, in one embodiment, the indexes 1813 can be a spatial index of the polygon points associated with stored feature polygons.

In exemplary embodiments, the road segment data records 1805 are links or segments representing roads, streets, or paths, as can be used in the calculated route or recorded route information for determination of one or more personalized routes. The node data records 1803 are end points corresponding to the respective links or segments of the road segment data records 1805. The road link data records 1805 and the node data records 1803 represent a road network, such as used by vehicles, cars, and/or other entities. In addition, the geographic database 109 can contain path segment and node data records or other data that represent 3D paths around 3D map features (e.g., terrain features, buildings, other structures, etc.) that occur above street level, such as when routing or representing flightpaths of aerial vehicles (e.g., drones 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1807. The geographic database 109 can also include data about places, such as cities, towns, or other communities, and other geographic features, such as bodies of water, mountain ranges, etc. Such place or feature data can be part of the POI data records 1807 or can be associated with POIs or POI data records 1807 (such as a data point used for displaying or representing a position of a city).

In one embodiment, the geographic database 109 can also include risk factor data records 1809 for the digital map data representing risk factors or risk-related data, calculated risk levels (e.g., collision probability, probability of survival due to shape-related factors, probability of survival due to aerial-vehicle related factors, etc.), risk level visualizations, dynamic population density predictions generated for areas or interest, and related data. In one embodiment, the risk factor data records 1809 can be associated with one or more of the node records 1803, road segment records 1805, and/or POI data records 1807 so that the predicted population densities can inherit characteristics, properties, metadata, etc. of the associated records (e.g., location, address, POI type, etc.). In one embodiment, the system 100 (e.g., via the routing platform 107 can use the dynamic population density predictions to generate aerial vehicles routes.

In one embodiment, the system 100 is capable of generating aerial routes using the digital map data and/or real-time data stored in the geographic database 109 based on risk level visualization and/or predictions. The resulting aerial routing and guidance can be stored in the aerial routing data records 1811. By way of example, the routes stored in the data records 1811 can be created for individual 3D flight-paths or routes as they are requested by drones or their operators. In this way, previously generated aerial routes can be reused for future drone travel to the same target location.

In one embodiment, the aerial routes stored in the aerial routing data records 1811 can be specific to characteristics of the aerial vehicle 101 (e.g., drone type, size, supported modes of operation) and/or other population density characteristics of the route. In addition, the aerial routes generated according to the embodiments described herein can be based on contextual parameters (e.g., time-of-day, day-of-week, season, etc.).

In one embodiment, the geographic database 109 can be maintained by the services platform 117 and/or any of the services 119 of the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., LiDAR) to travel along roads and/or within buildings/ structures throughout the geographic region to observe features and/or record information about them, for example. Also, remote sensing, such as aerial or satellite photography or other sensor data, can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the aerial vehicle 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing aerial route calculation in a 3D space may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 19:
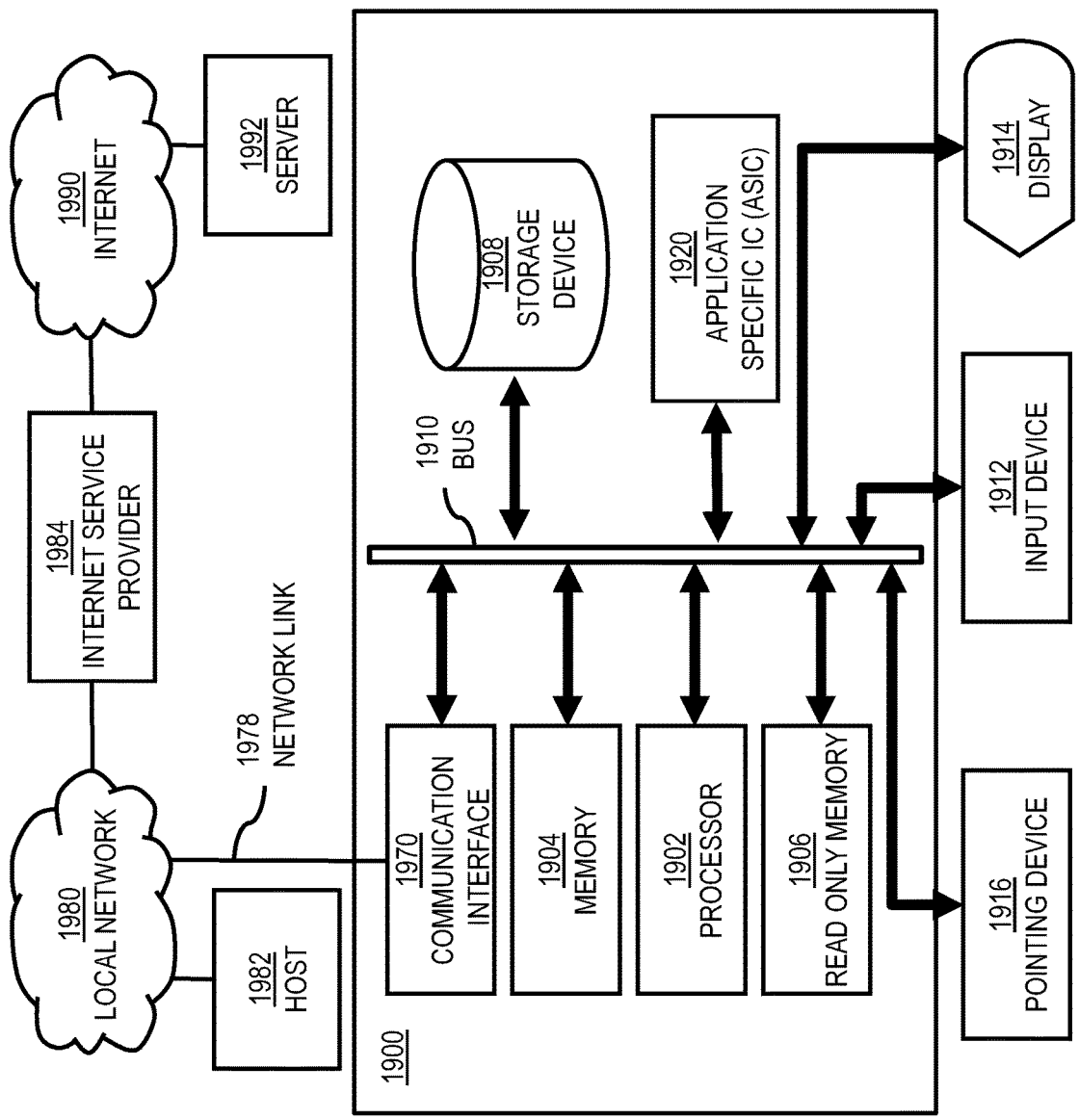
FIG. 19 is a diagram of hardware that can be used to implement an embodiment.

FIG. 19 illustrates a computer system 1900 upon which an embodiment of the invention may be implemented. Computer system 1900 is programmed (e.g., via computer program code or instructions) to provide aerial route calculation in a 3D space as described herein and includes a communication mechanism such as a bus 1910 for passing information between other internal and external components of the computer system 1900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1910 includes one or more parallel conductors of information so that information is transferred quickly among devices coupled to the bus 1910. One or more processors 1902 for processing information are coupled with the bus 1910.

A processor 1902 performs a set of operations on information as specified by computer program code related to providing aerial route calculation in a 3D space. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1910 and placing information on the bus 1910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1900 also includes a memory 1904 coupled to bus 1910. The memory 1904, such as a random access memory (RAM) or other dynamic storage device, stores information including processor instructions for providing aerial route calculation in a 3D space. Dynamic memory allows information stored therein to be changed by the computer system 1900. RAM allows a unit of information stored at a location called a memory address to be stored and retrieved independently of information at neighboring addresses. The memory 1904 is also used by the processor 1902 to store temporary values during execution of processor instructions. The computer system 1900 also includes a read only memory (ROM) 1906 or other static storage device coupled to the bus 1910 for storing static information, including instructions, that is not changed by the computer system 1900. Some memory is composed of volatile storage that loses the information stored thereon when power is lost. Also coupled to bus 1910 is a non-volatile (persistent) storage device 1908, such as a magnetic disk, optical disk or flash card, for storing information, including instructions, that persists even when the computer system 1900 is turned off or otherwise loses power.

Information, including instructions for providing aerial route calculation in a 3D space, is provided to the bus 1910 for use by the processor from an external input device 1912, such as a keyboard containing alphanumeric keys operated by a human user, or a sensor. A sensor detects conditions in its vicinity and transforms those detections into physical expression compatible with the measurable phenomenon used to represent information in computer system 1900. Other external devices coupled to bus 1910, used primarily for interacting with humans, include a display device 1914, such as a cathode ray tube (CRT) or a liquid crystal display (LCD), or plasma screen or printer for presenting text or images, and a pointing device 1916, such as a mouse or a trackball or cursor direction keys, or motion sensor, for controlling a position of a small cursor image presented on the display 1914 and issuing commands associated with graphical elements presented on the display 1914. In some embodiments, for example, in embodiments in which the computer system 1900 performs all functions automatically without human input, one or more of external input device 1912, display device 1914 and pointing device 1916 is omitted.

In the illustrated embodiment, special purpose hardware, such as an application specific integrated circuit (ASIC) 1920, is coupled to bus 1910. The special purpose hardware is configured to perform operations not performed by processor 1902 quickly enough for special purposes. Examples of application specific ICs include graphics accelerator cards for generating images for display 1914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1900 also includes one or more instances of a communications interface 1970 coupled to bus 1910. Communication interface 1970 provides a one-way or two-way communication coupling to a variety of external devices that operate with their own processors, such as printers, scanners and external disks. In general the coupling is with a network link 1978 that is connected to a local network 1980 to which a variety of external devices with their own processors are connected. For example, communication interface 1970 may be a parallel port or a serial port or a universal serial bus (USB) port on a personal computer. In some embodiments, communications interface 1970 is an integrated services digital network (ISDN) card or a digital subscriber line (DSL) card or a telephone modem that provides an information communication connection to a corresponding type of telephone line. In some embodiments, a communication interface 1970 is a cable modem that converts signals on bus 1910 into signals for a communication connection over a coaxial cable or into optical signals for a communication connection over a fiber optic cable. As another example, communications interface 1970 may be a local area network (LAN) card to provide a data communication connection to a compatible LAN, such as Ethernet. Wireless links may also be implemented. For wireless links, the communications interface 1970 sends or receives or both sends and receives electrical, acoustic or electromagnetic signals, including infrared and optical signals, that carry information streams, such as digital data. For example, in wireless handheld devices, such as mobile telephones like cell phones, the communications interface 1970 includes a radio band electromagnetic transmitter and receiver called a radio transceiver. In certain embodiments, the communications interface 1970 enables connection to the communication network 121 for providing aerial route calculation in a 3D space.

The term computer-readable medium is used herein to refer to any medium that participates in providing information to processor 1902, including instructions for execution. Such a medium may take many forms, including, but not limited to, non-volatile media, volatile media and transmission media. Non-volatile media include, for example, optical or magnetic disks, such as storage device 1908. Volatile media include, for example, dynamic memory 1904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 20 illustrates a chip set 2000 upon which an embodiment of the invention may be implemented. Chip set 2000 is programmed to provide aerial route calculation in a 3D space as described herein and includes, for instance, the processor and memory components described with respect to FIG. 19 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 2000 includes a communication mechanism such as a bus 2001 for passing information among the components of the chip set 2000. A processor 2003 has connectivity to the bus 2001 to execute instructions and process information stored in, for example, a memory 2005. The processor 2003 may include one or more processing cores with each core configured to perform independently. A multi-core processor enables multiprocessing within a single physical package. Examples of a multi-core processor include two, four, eight, or greater numbers of processing cores. Alternatively or in addition, the processor 2003 may include one or more microprocessors configured in tandem via the bus 2001 to enable independent execution of instructions, pipelining, and multithreading. The processor 2003 may also be accompanied with one or more specialized components to perform certain processing functions and tasks such as one or more digital signal processors (DSP) 2007, or one or more application-specific integrated circuits (ASIC) 2009. A DSP 2007 typically is configured to process real-world signals (e.g., sound) in real time independently of the processor 2003. Similarly, an ASIC 2009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2003 and accompanying components have connectivity to the memory 2005 via the bus 2001. The memory 2005 includes both dynamic memory (e.g., RAM, magnetic disk, writable optical disk, etc.) and static memory (e.g., ROM, CD-ROM, etc.) for storing executable instructions that when executed perform the inventive steps described herein to provide aerial route calculation in a 3D space. The memory 2005 also stores the data associated with or generated by the execution of the inventive steps.

Figure 21:
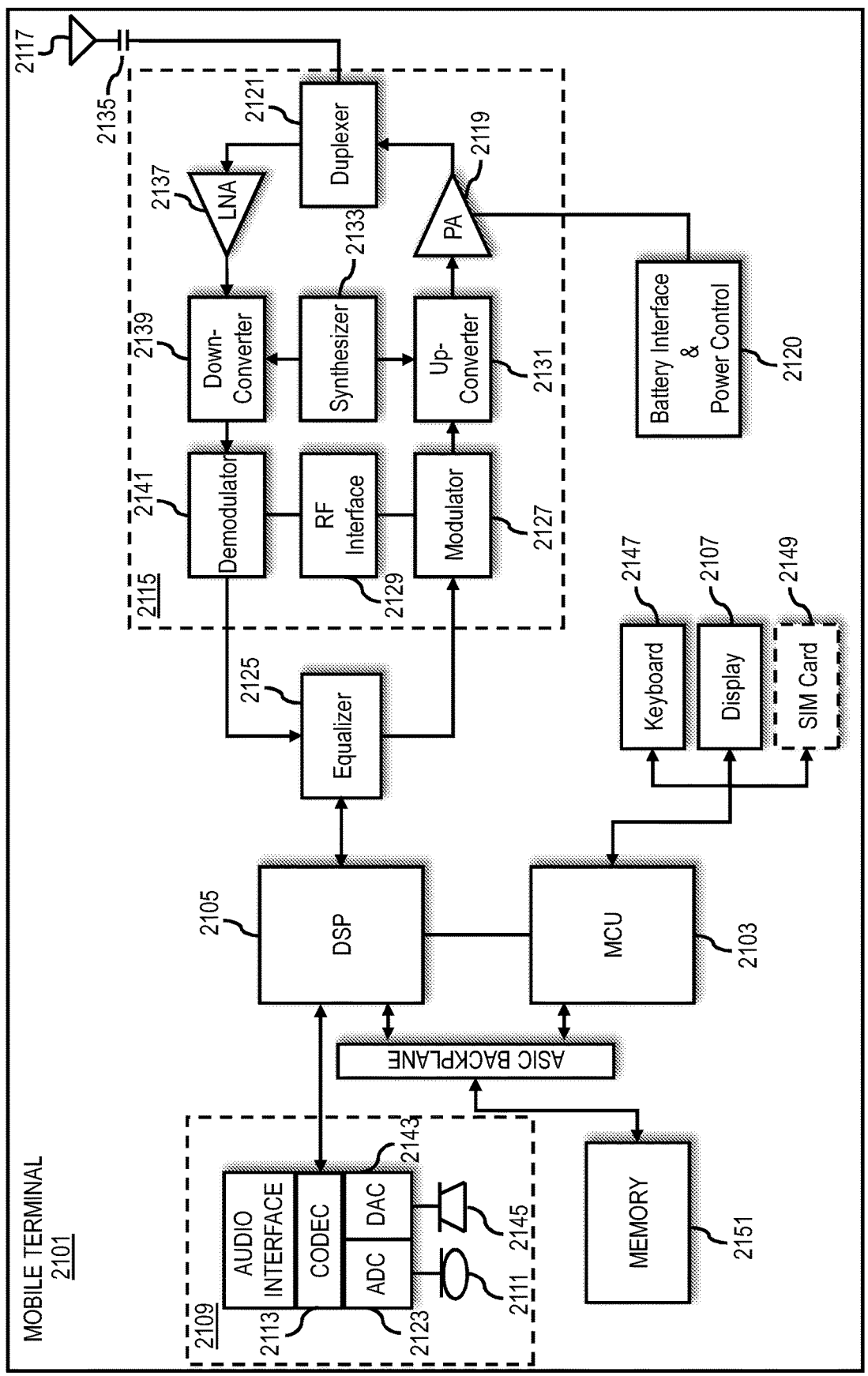
FIG. 21 is a diagram of a mobile terminal (e.g., handset or aerial vehicle or part thereof) that can be used to implement an embodiment.

FIG. 21 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 2103, a Digital Signal Processor (DSP) 2105, and a receiver/transmitter unit including a microphone gain control unit and a speaker gain control unit. A main display unit 2107 provides a display to the user in support of various applications and mobile station functions that offer automatic contact matching. An audio function circuitry 2109 includes a microphone 2111 and microphone amplifier that amplifies the speech signal output from the microphone 2111. The amplified speech signal output from the microphone 2111 is fed to a coder/decoder (CODEC) 2113.

A radio section 2115 amplifies power and converts frequency in order to communicate with a base station, which is included in a mobile communication system, via antenna 2117. The power amplifier (PA) 2119 and the transmitter/modulation circuitry are operationally responsive to the MCU 2103, with an output from the PA 2119 coupled to the duplexer 2121 or circulator or antenna switch, as known in the art. The PA 2119 also couples to a battery interface and power control unit 2120.

In use, a user of mobile station 2101 speaks into the microphone 2111 and his or her voice along with any detected background noise is converted into an analog voltage. The analog voltage is then converted into a digital signal through the Analog to Digital Converter (ADC) 2123. The control unit 2103 routes the digital signal into the DSP 2105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 2125 for compensation of any frequency-dependent impairments that occur during transmission though the air such as phase and amplitude distortion. After equalizing the bit stream, the modulator 2127 combines the signal with a RF signal generated in the RF interface 2129. The modulator 2127 generates a sine wave by way of frequency or phase modulation. In order to prepare the signal for transmission, an up-converter 2131 combines the sine wave output from the modulator 2127 with another sine wave generated by a synthesizer 2133 to achieve the desired frequency of transmission. The signal is then sent through a PA 2119 to increase the signal to an appropriate power level. In practical systems, the PA 2119 acts as a variable gain amplifier whose gain is controlled by the DSP 2105 from information received from a network base station. The signal is then filtered within the duplexer 2121 and optionally sent to an antenna coupler 2135 to match impedances to provide maximum power transfer. Finally, the signal is transmitted via antenna 2117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 2101 are received via antenna 2117 and immediately amplified by a low noise amplifier (LNA) 2137. A down-converter 2139 lowers the carrier frequency while the demodulator 2141 strips away the RF leaving only a digital bit stream. The signal then goes through the equalizer 2125 and is processed by the DSP 2105. A Digital to Analog Converter (DAC) 2143 converts the signal and the resulting output is transmitted to the user through the speaker 2145, all under control of a Main Control Unit (MCU) 2103—which can be implemented as a Central Processing Unit (CPU) (not shown).

The MCU 2103 receives various signals including input signals from the keyboard 2147. The keyboard 2147 and/or the MCU 2103 in combination with other user input components (e.g., the microphone 2111) comprise a user interface circuitry for managing user input. The MCU 2103 runs a user interface software to facilitate user control of at least some functions of the mobile station 2101 to provide aerial route calculation in a 3D space. The MCU 2103 also delivers a display command and a switch command to the display 2107 and to the speech output switching controller, respectively. Further, the MCU 2103 exchanges information with the DSP 2105 and can access an optionally incorporated SIM card 2149 and a memory 2151. In addition, the MCU 2103 executes various control functions required of the station. The DSP 2105 may, depending upon the implementation, perform any of a variety of conventional digital processing functions on the voice signals. Additionally, DSP 2105 determines the background noise level of the local environment from the signals detected by microphone 2111 and sets the gain of microphone 2111 to a level selected to compensate for the natural tendency of the user of the mobile station 2101.

The CODEC 2113 includes the ADC 2123 and DAC 2143. The memory 2151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 2151 may be, but not limited to, a single memory, CD, DVD, ROM, RAM, EEPROM, optical storage, or any other non-volatile or non-transitory storage medium capable of storing digital data.

An optionally incorporated SIM card 2149 carries, for instance, important information, such as the cellular phone number, the carrier supplying service, subscription details, and security information. The SIM card 2149 serves primarily to identify the mobile station 2101 on a radio network. The card 2149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
monitoring a flight of an aerial vehicle through a three-dimensional (3D) space, wherein the 3D space is partitioned into a plurality of 3D shapes of varying resolutions;
detecting an entry of the aerial vehicle into one 3D shape of the plurality of 3D shapes, wherein the one 3D shape represents a bounded volume of the 3D space;
on detecting an exit of the aerial vehicle from the one 3D shape, recording a 3D shape identifier (ID) of the one 3D shape and at least one of a first timestamp indicating the entry, a second timestamp indicating the exit, a duration of stay in the one 3D shape, dimensions of the aerial vehicle, or a combination thereof as a dynamic obstacle observation record; and
transmitting the dynamic obstacle observation record to a server, wherein the server aggregates the dynamic obstacle observation record with at least one additional dynamic obstacle observation record of at least one additional aerial vehicle to calculate a dynamic obstacle collision probability in the one 3D shape.

2. The method of claim 1, further comprising:
determining that the one 3D shape is not on an aerial route calculated for the aerial vehicle; and
selecting a resolution of the one 3D shape.

3. The method of claim 2, wherein the dynamic obstacle observation record is reported at the selected resolution while the aerial vehicle is off the aerial route.

4. The method of claim 1, wherein the one 3D shape is on an aerial route calculated for the aerial vehicle.

5. The method of claim 4, wherein the aerial route comprises a list of the plurality of 3D shapes forming the aerial route.

6. The method of claim 1, wherein the plurality of 3D shapes is a plurality of cubes.

7. A non-transitory computer-readable storage medium carrying one or more sequences of one or more instructions which, when executed by one or more processors, cause an apparatus to perform:
monitoring a flight of an aerial vehicle through a three-dimensional (3D) space, wherein the 3D space is partitioned into a plurality of 3D shapes of varying resolutions;
detecting an entry of the aerial vehicle into one 3D shape of the plurality of 3D shapes, wherein the one 3D shape represents a bounded volume of the 3D space;
on detecting an exit of the aerial vehicle from the one 3D shape, recording a 3D shape identifier (ID) of the one 3D shape and at least one of a first timestamp indicating the entry, a second timestamp indicating the exit, a duration of stay in the one 3D shape, dimensions of the aerial vehicle, or a combination thereof as a dynamic obstacle observation record; and
transmitting the dynamic obstacle observation record to a server, wherein the server aggregates the dynamic obstacle observation record with at least one additional dynamic obstacle observation record of at least one additional aerial vehicle to calculate a dynamic obstacle collision probability in the one 3D shape.

8. The non-transitory computer-readable storage medium of claim 7, wherein the one 3D shape is on an aerial route calculated for the aerial vehicle.

* * * * *